US008170203B2

(12) United States Patent
Ghouti et al.

(10) Patent No.: US 8,170,203 B2
(45) Date of Patent: May 1, 2012

(54) MESSAGE AUTHENTICATION CODE WITH ELLIPTIC POLYNOMIAL HOPPING

(75) Inventors: Lahouari Ghouti, Dhahran (SA); Mohammad K. Ibrahim, Leicester (GB); Atef J. Al-Najjar, Dhahran (SA)

(73) Assignee: King Fahd University of Petroleum & Minerals, Dhahran (SA)

( * ) Notice: Subject to any disclaimer, the term of this patent is extended or adjusted under 35 U.S.C. 154(b) by 793 days.

(21) Appl. No.: 12/318,584

(22) Filed: Dec. 31, 2008

(65) Prior Publication Data

US 2010/0169644 A1 Jul. 1, 2010

(51) Int. Cl.
*H04L 29/06* (2006.01)

(52) U.S. Cl. ............ 380/28; 380/29; 708/100; 708/200; 708/490; 708/492; 713/168; 713/170; 713/181

(58) Field of Classification Search ............ 380/28, 380/29; 708/100, 200, 490, 492; 713/168, 713/170, 181
See application file for complete search history.

(56) References Cited

U.S. PATENT DOCUMENTS

| | | | |
|---|---|---|---|
| 4,424,414 A | 1/1984 | Hellman et al. | |
| 4,668,103 A | 5/1987 | Wilson | |
| 4,995,082 A | 2/1991 | Schnorr | |
| 5,010,573 A | 4/1991 | Musyck et al. | |
| 5,054,066 A | 10/1991 | Riek et al. | |
| 5,146,500 A | 9/1992 | Maurer | |
| 5,150,411 A | 9/1992 | Maurer | |
| 5,272,755 A | 12/1993 | Miyaji et al. | |
| 5,497,423 A * | 3/1996 | Miyaji | 380/30 |
| 5,651,069 A | 7/1997 | Rogaway | |
| 5,892,829 A | 4/1999 | Aiello et al. | |
| 6,088,798 A * | 7/2000 | Shimbo | 713/176 |
| 6,128,737 A | 10/2000 | Jakubowski et al. | |
| 6,243,467 B1 * | 6/2001 | Reiter et al. | 380/30 |
| 6,816,594 B1 | 11/2004 | Okeya | |
| 7,050,580 B1 | 5/2006 | Ferre Herrero | |
| 7,190,787 B1 | 3/2007 | Graunke et al. | |
| 2003/0072443 A1 | 4/2003 | Harley et al. | |
| 2006/0029220 A1 * | 2/2006 | Ibrahim | 380/28 |
| 2006/0029221 A1 * | 2/2006 | Ibrahim | 380/28 |
| 2006/0098814 A1 | 5/2006 | Al-Khoraidly et al. | |
| 2007/0118746 A1 * | 5/2007 | Lauter et al. | 713/170 |
| 2007/0217601 A1 * | 9/2007 | Lambert et al. | 380/28 |
| 2010/0166174 A1 * | 7/2010 | Ghouti et al. | 380/28 |
| 2010/0166175 A1 * | 7/2010 | Ghouti et al. | 380/28 |
| 2010/0166176 A1 * | 7/2010 | Ghouti et al. | 380/29 |
| 2010/0169658 A1 * | 7/2010 | Ghouti et al. | 713/181 |
| 2010/0177890 A1 * | 7/2010 | Ghouti et al. | 380/30 |
| 2010/0318804 A1 * | 12/2010 | Volkovs | 713/176 |
| 2011/0200185 A1 * | 8/2011 | Ghouti et al. | 380/28 |

FOREIGN PATENT DOCUMENTS

| | | |
|---|---|---|
| EP | 0874307 | 10/1998 |
| EP | 0892520 | 1/1999 |
| EP | 1215642 | 6/2002 |

OTHER PUBLICATIONS

Gupta et al. "Speeding up secure web transactions using elliptic curve cryptography", 2004, Cryptography, 11th Network and Systems Security Symposium, pp. 231-239.*
"Twisting an Elliptic Curve to Speed Up Cryptography"; http://www.cecs.csulb.edu/~englert/research/elliptic.pdf; 10 pages; printed on Jun. 11, 2008.

* cited by examiner

*Primary Examiner* — Nathan Flynn
*Assistant Examiner* — Sarah Su
(74) *Attorney, Agent, or Firm* — Richard C. Litman

(57) ABSTRACT

The message authentication code with elliptic polynomial hopping provides methods for the generation of message authentication codes (MACs) utilizing elliptic curves, which are based on the elliptic curve discrete logarithm problem. The elliptic curve discrete logarithm problem is well known to be a computationally "difficult" or "hard" problem, thus providing enhanced security for the MACs. Different elliptic polynomials are used for different blocks of the same plaintext, each elliptic polynomial for each message block being selected at random using an initial secret key and a random number generator.

8 Claims, No Drawings

MESSAGE AUTHENTICATION CODE WITH ELLIPTIC POLYNOMIAL HOPPING

BACKGROUND OF THE INVENTION

Field of the Invention

The present invention relates to cryptographic systems and methods used for electronic communication of messages over a computer network, such as the Internet, and particularly to a message authentication code with elliptic polynomial hopping that provides greater security for electronic communications than conventional encryption techniques.

In recent years, the Internet community has experienced explosive and exponential growth. Given the vast and increasing magnitude of this community, both in terms of the number of individual users and web sites, and the sharply reduced costs associated with electronically communicating information, such as e-mail messages and electronic files, between one user and another, as well as between any individual client computer and a web server, electronic communication, rather than more traditional postal mail, is rapidly becoming a medium of choice for communicating information. The Internet, however, is a publicly accessible network, and is thus not secure. The Internet has been, and increasingly continues to be, a target of a wide variety of attacks from various individuals and organizations intent on eavesdropping, intercepting and/or otherwise compromising or even corrupting message traffic flowing on the Internet, or further illicitly penetrating sites connected to the Internet.

Encryption by itself provides no guarantee that an enciphered message cannot or has not been compromised during transmission or storage by a third party. Encryption does not assure integrity due to the fact that an encrypted message could be intercepted and changed, even though it may be, in any instance, practically impossible, to cryptanalyze. In this regard, the third party could intercept, or otherwise improperly access, a ciphertext message, then substitute a predefined illicit ciphertext block(s), which that party, or someone else acting in concert with that party, has specifically devised for a corresponding block(s) in the message. The intruding party could thereafter transmit the resulting message with the substituted ciphertext block(s) to the destination, all without the knowledge of the eventual recipient of the message.

The field of detecting altered communication is not confined to Internet messages. With the burgeoning use of stand-alone personal computers, individuals or businesses often store confidential information within the computer, with a desire to safeguard that information from illicit access and alteration by third parties. Password controlled access, which is commonly used to restrict access to a given computer and/or a specific file stored thereon, provides a certain, but rather rudimentary, form of file protection. Once password protection is circumvented, a third party can access a stored file and then change it, with the owner of the file then being completely oblivious to any such change.

In order to ensure message integrity, systems that depend on a shared secret key often rely upon message authentication codes (MACs). The MAC uses the secret key and the message text to produce a bit string unique to the key and the text of the message, the bit string being appended to the message. The MAC bit string is usually compressed to a fixed number of bits, so that it is much shorter than the message text. When a recipient is able to use his secret key and the text message to generate a MAC that is identical to the MAC appended to the message, the recipient can be confident in the integrity of the message, i.e., that the message has not been altered.

A number of encryption techniques have been used to generate MACs. Some MACs are generated using block ciphers, such as the MAC made with DES. Such MACs, however, are vulnerable to brute force attacks. Other MACs are generated using hash functions, such as MD5, RIPEMD-160, SHA-1, etc. One popular MAC is HMAC, which combines a secret key with a non-keyed hash function, such as SHA-1 or MD5. However, such MACs rely upon the invulnerability of the hash function for their security against various forms of attack. However, the security of such hash functions against attacks has come into question because of successful attacks and evidence of their vulnerability to collisions. None of the current MAC generation algorithms incorporate a hash function that is based upon a mathematically hard problem, and particularly not the elliptic curve discrete logarithm problem.

Thus, a message authentication code using elliptic polynomial hopping solving the aforementioned problems is desired.

SUMMARY OF THE INVENTION

The message authentication code with elliptic polynomial hopping provides methods for the generation of message authentication codes (MACs) utilizing elliptic curves, which are based on the elliptic curve discrete logarithm problem. The elliptic curve discrete logarithm problem is well known to be a computationally "difficult" or "hard" problem, thus providing enhanced security for the MACs. Different elliptic polynomials are used for different blocks of the same plaintext, each elliptic polynomial for each message block being selected at random using an initial secret key and a random number generator.

These and other features of the present invention will become readily apparent upon further review of the following specification.

DETAILED DESCRIPTION OF THE PREFERRED EMBODIMENTS

The message authentication code (MACs) with elliptic polynomial hopping is based on the elliptic curve discrete logarithm problem, which is a computationally hard problem. The MACs rely upon a particular subset of elliptic polynomials, as described below.

The MACs to be described below use elliptic polynomial hopping in their generation, where different elliptic polynomials are used for different blocks of the same plaintext. Particularly, the MACs functions use an elliptic polynomial with more than one independent x-coordinate. More specifically, a set of elliptic polynomial points are used that satisfy an elliptic polynomial equation with more than one independent x-coordinate which is defined over a finite field F having the following properties: One of the variables (the y-coordinate) has a maximum degree of two, and appears on its own in only one of the monomials; the other variables (the x-coordinates) have a maximum degree of three, and each must appear in at least one of the monomials with a degree of three; and all monomials which contain x-coordinates must have a total degree of three.

The group of points of the elliptic polynomial with the above form is defined over additions in the extended dimensional space and, as will be described in detail below, the method makes use of elliptic polynomial hopping where different elliptic polynomials are used for different blocks of the same plaintext.

The particular advantage of using elliptic polynomial cryptography with more than one x-coordinate is that additional x-coordinates are used to embed extra message data bits in a single elliptic point that satisfies the elliptic polynomial equation. Given that nx additional x-coordinates are used, with nx being greater than or equal to one, a resulting elliptic point has (nx+1) x-coordinates, where all coordinates are elements of the finite field F. The number of points which satisfy an elliptic polynomial equation with nx additional x-coordinates defined over F and which can be used in the corresponding cryptosystem is increased by a factor of $(\#F)^{nx}$, where # denotes the size of a field.

Through the use of this particular method, security is increased through the usage of different elliptic polynomials for different message blocks during the generation of a message authentication code. Further, each elliptic polynomial used for each message block is selected at random, preferably using an initial value and a random number generator.

Given the form of the elliptic polynomial equation described above, the elliptic polynomial and its twist are isomorphic with respect to one another. The method uses an embedding technique, to be described in greater detail below, which allows the embedding of a bit string into the x-coordinates of an elliptic polynomial point in a deterministic and non-iterative manner when the elliptic polynomial has the above described form. This embedding method overcomes the disadvantage of the time overhead of the iterative embedding methods used in existing elliptic polynomial.

The difficulty of using conventional elliptic polynomial cryptography to develop message authentication codes typically lies in the iterative and non-deterministic method needed to embed a bit string into an elliptic polynomial point, which has the drawback of the number of iterations needed being different for different bit strings which are being embedded. As a consequence, different MAC generation times are required for different blocks of bit strings. Such a data-dependant generation time is not suitable for generating MACs, which require data independent encryption time. Further, with regard to iterative and non-deterministic methods in conventional elliptic polynomial cryptography, given an elliptic polynomial defined over a finite field that needs N-bits for the representation of its elements, only $((nx+ny+1)N-L)$ bits of the message data bits can be embedded in any elliptic polynomial point.

The isomorphic relationship between an elliptic polynomial and its twist, which is obtained as a result of the given form of the elliptic polynomial equation, ensures that any bit string whose equivalent binary value is an element of the underlying finite field has a bijective relationship between the bit string and a point which is either on the elliptic polynomial or its twist. This bijective relationship allows for the development of the elliptic polynomial hopping based MACs to be described below.

In the conventional approach to elliptic polynomial cryptography, the security of the resulting cryptosystem relies on breaking the elliptic polynomial discrete logarithm problem, which can be summarized as: given the points $k(x_{0,B}, x_{1,B}, \ldots, x_{nx,B}, y_B)$ and $(x_{0,B}, x_{1,B}, \ldots, x_{nx,B}, y_B)$, find the scalar k.

As will be described below, different elliptic polynomials are used for each block of the message data, where each elliptic polynomial used for each message block is selected at random using an initial value and a random number generator. Since the elliptic polynomial used for each message block is not known, this makes the elliptic polynomial discrete logarithm problem far more difficult to solve, since the attacker does not know the elliptic polynomial coefficients that are needed in order to compute point additions and point doublings.

Further, projective coordinates are used at the sending and receiving entities in order to eliminate inversion or division during each point addition and doubling operation of the scalar multiplication. It should be noted that all of the elliptic polynomial cryptography-based MACs disclosed herein are scalable.

In the following, with regard to elliptic polynomials, the "degree" of a variable $u^i$ is simply the exponent i. A polynomial is defined as the sum of several terms, which are herein referred to as "monomials", and the total degree of a monomial $u^i v^j w^k$ is given by $(i+j+k)$. Further, in the following, the symbol $\in$ denotes set membership.

One form of the subject elliptic polynomial equation with more than one x-coordinate and one or more y-coordinates is defined as follows: the elliptic polynomial is a polynomial with more than two independent variables such that the maximum total degree of any monomial in the polynomial is three; at least two or more of the variables, termed the x-coordinates, have a maximum degree of three, and each must appear in at least one of the monomials with a degree of three; and at least one or more variables, termed the y-coordinates, have a maximum degree of two, and each must appear in at least one of the monomials with a degree of two.

Letting $S_{nx}$ represents the set of numbers from 0 to nx (i.e., $S_{nx}=\{0, \ldots, nx\}$), and letting $S_{ny}$ represents the set of numbers from 0 to ny (i.e., $S_{ny}=\{0, \ldots, ny\}$), and further setting $(nx+ny) \geq 1$, then, given a finite field, F, the following equation defined over F is one example of the polynomial described above:

$$\sum_{k \in S_{ny}} a_{1k} y_k^2 + \sum_{k,l \in S_{ny}, l \neq k} a_{2kl} y_k y_l + \sum_{k \in S_{ny}} a_{3k} y_k + \sum_{k,l \in S_{ny}, i \in S_{nx}} c_{1kli} y_k y_l x_i + \quad (1)$$
$$\sum_{k \in S_{ny}, l \in S_{nx}} c_{2kl} y_k x_l + \sum_{k \in S_{ny}, l,i \in S_{nx}} c_{3kli} y_k x_l x_i =$$
$$\sum_{l \in S_{nx}} b_{1l} x_l^3 + \sum_{l,k \in S_{nx}, l \neq k} b_{2lk} x_l^2 x_k + \sum_{l,k \in S_{nx}} b_{3lk} x_l x_k + \sum_{k \in S_{nx}} b_{4k} x_k + b_c,$$

where $a_{1l}, a_{2kl}, a_{3k}, c_{1lki}, c_{2kl}, c_{3kli}, b_{1l}, b_{2lk}, b_{3lk}, b_{4k}$ & $b_c \in F$.

Two possible examples of equation (1) are $y_0^2 = x_0^3 + x_1^3 + x_0 x_1$ and $y_0^2 + x_0 x_1 y_0 + y_0 = x_0^3 + x_1^3 + x_0^2 x_1 + x_0 x_1^2 + x_0 x_1 + x_0 + x_1$.

With regard to the use of the elliptic polynomial equation in the addition of points of an elliptic polynomial with more than one x-coordinate and one or more y-coordinates, we may examine specific coefficients $a_{1k}, a_{2kl}, a_{3k}, c_{1lki}, c_{2kl}, c_{3kli}, b_{1l}, b_{2lk}, b_{3lk}, b_{4k}$ & $b_c \in F$ for F, wherein a set of points $EC^{nx+ny+2}$ is defined as the (nx+ny+2)-tuple $(x_0, x_1, \ldots, x_{nx}, y_0, y_1, \ldots, y_{ny})$, where $x_i, y_k \in F$, $i \in S_{nx}$ and $k \in S_{ny}$. This set of points are solutions of F, though excluding the point $(0, 0, \ldots, 0)$ and the point at infinity, $(x_{0,I}, x_{1,I}, \ldots, x_{nx,I}, y_{0,I}, y_{1,I}, \ldots, y_{ny,I})$.

The rules for conventional elliptic curve point addition may be adopted to define an additive binary operation, "+", over $EC^{nx+ny+2}$, i.e., for all $$(x_{0,1}, x_{1,1}, \ldots, x_{nx,1}, y_{0,1}, y_{1,1}, \ldots, y_{ny,1}) \in EC^{nx+ny+2}$$

and $$(x_{0,2}, x_{1,2}, \ldots, x_{nx,2}, y_{0,2}, y_{1,2}, \ldots, y_{ny,2}) \in EC^{nx+ny+2},$$

the sum:

$$(x_{0,3}, x_{1,3}, \ldots, x_{nx,3}, y_{0,3}, y_{1,3}, \ldots, y_{ny,3}) = (x_{0,1}, x_{1,1}, \ldots, x_{nx,1}, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2})$$

is also $$(x_{0,3}, x_{1,3}, \ldots, x_{nx,3}, y_{0,3}, y_{1,3}, \ldots, y_{ny,3}) \in EC^{nx+ny+2}.$$

As will be described in greater detail below, $(EC^{nx+ny+2}, +)$ forms a pseudo-group (p-group) over addition that satisfies the following axioms:

(i) There exists a set $(x_{0,I}, x_{1,I}, \ldots, x_{nx,I}, y_{0,I}, y_{1,I}, \ldots, y_{ny,I}) \in EC^{nx+ny+2}$ such that $(x_0, x_1, \ldots, x_{nx}, y_0, y_1, \ldots, y_{ny})+(x_{0,I}, x_{1,I}, \ldots, x_{nx,I}, y_{0,I}, y_{1,I}, \ldots, y_{ny,I})=(x_0, x_1, \ldots, x_{nx}, y_0, y_1, \ldots, y_{ny})$ for all $(x_0, x_1, \ldots, x_{nx}, y_0, y_1, \ldots, y_{ny}) \in EC^{nx+ny+2}$;

(ii) for every set $(x_0, x_1, \ldots, x_{nx}, y_0, y_1, \ldots, y_{ny}) \in EC^{nx+ny+2}$, there exists an inverse set, $-(x_0, x_1, \ldots, x_{nx}, y_0, y_1, \ldots, y_{ny}) \in EC^{nx+ny+2}$, such that $(x_0, x_1, \ldots, x_{nx}, y_0, y_1, \ldots, y_{ny})-(x_0, x_1, \ldots, x_{nx}, y_0, y_1, \ldots, y_{ny})=(x_{0,I}, x_{1,I}, \ldots, x_{nx,I}, y_{0,I}, y_{1,I}, \ldots, y_{ny,I})$;

(iii) the additive binary operation in $(EC^{nx+ny+2}, +)$ is commutative, and the p-group $(EC^{nx+ny+2}, +)$ forms a group over addition when:

(iv) the additive binary operation in $(EC^{nx+ny+2}, +)$ is associative.

Prior to a more detailed analysis of the above axioms, the concept of point equivalence must be further developed. Mappings can be used to indicate that an elliptic point represented using (nx+1) x-coordinates and (ny+1) y-coordinates, $(x_0, x_1, \ldots, x_{nx}, y_0, y_1, \ldots, y_{ny})$, is equivalent to one or more elliptic points that satisfy the same elliptic polynomial equation, including the equivalence of an elliptic point to itself.

Points that are equivalent to one another can be substituted for each other at random, or according to certain rules during point addition and/or point doubling operations. For example, the addition of two points $(x_{0,1}, x_{1,1}, \ldots, x_{nx,1}, y_{0,1}, y_{1,1}, \ldots, y_{ny,1})$ and $(x_{0,2}, x_{1,2}, \ldots, x_{nx,2}, y_{0,2}, y_{1,2}, \ldots, y_{ny,2})$ is given by:

$$(x_{0,3}, x_{1,3}, \ldots, x_{nx,3}, y_{0,3}, y_{1,3}, \ldots, y_{ny,3}) = (x_{0,1}, x_{1,1}, \ldots, x_{nx,1}, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2})$$

If the point $(x''_{0,1}, x''_{1,1}, \ldots, x''_{nx,1}, y''_{0,1}, y''_{1,1}, \ldots, y''_{ny,1})$ is equivalent to the point $(x_{0,1}, x_{1,1}, \ldots, x_{nx,1}, y_{0,1}, y_{1,1}, \ldots, y_{ny,1})$, then the former can be substituted for $(x_{0,1}, x_{1,1}, \ldots, x_{nx,1}, y_{0,1}, y_{1,1}, \ldots, y_{ny,1})$ in the above equation in order to obtain:

$$(x_{0,3}, x_{1,3}, \ldots, x_{nx,3}, y_{0,3}, y_{1,3}, \ldots, y_{ny,3}) = (x''_{0,1}, x''_{1,1}, \ldots, x''_{nx,1}, y''_{0,1}, y''_{1,1}, \ldots, y''_{ny,1}) + (x_{0,2}, x_{1,2}, \ldots, x_{nx,2}, y_{0,2}, y_{1,2}, \ldots, y_{ny,2}).$$

Mappings that are used to define equivalences can be based on certain properties that exist in elliptic polynomial equations, such as symmetry between variables. As an example, we consider the point $(x_0, x_1, y_0)$ that satisfies the equation $y_0^2 = x_0^3 + x_1^3 + x_0 x_1$. The equivalent of this point may be defined as $(x_1, x_0, -y_0)$.

With regard to the addition rules for $(EC^{nx+ny+2}, +)$, the addition operation of two points $(x_{0,1}, x_{1,1}, \ldots, x_{nx,1}, y_{0,1}, y_{1,1}, \ldots, y_{ny,1}) \in EC^{nx+ny+2}$ and $(x_{0,2}, x_{1,2}, \ldots, x_{nx,2}, y_{0,2}, y_{1,2}, \ldots, y_{ny,2}) \in EC^{nx+ny+2}$, otherwise expressed as:

$$(x_{0,3}, x_{1,3}, \ldots, x_{nx,3}, y_{0,3}, y_{1,3}, \ldots, y_{ny,3}) = (x_{0,1}, x_{1,1}, \ldots, x_{nx,1}, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2})$$

is calculated in the following manner. First, a straight line is drawn which is passes through the two points to be added. The straight line intersects $EC^{nx+ny+2}$ at a third point, which we denote $(x'_{0,3}, x'_{1,3}, \ldots, x'_{nx,3}, y'_{0,3}, y'_{1,3}, \ldots, y'_{ny,3}) \in EC^{nx+ny+2}$. The sum point is defined as $(x_{0,3}, x_{1,3}, \ldots, x_{nx,3}, y_{0,3}, y_{1,3}, \ldots, y_{ny,3}) = -(x'_{0,3}, x'_{1,3}, \ldots, x'_{nx,3}, y'_{0,3}, y'_{1,3}, \ldots, y'_{ny,3})$.

From the above definition of the addition rule, addition over $EC^{nx+ny+2}$ is commutative, that is:

$$(x_{0,1}, x_{1,1}, \ldots, x_{nx,1}, y_{0,1}, y_{1,1}, \ldots, y_{ny,1}) + (x_{0,2}, x_{1,2}, \ldots, x_{nx,2}, y_{0,2}, y_{1,2}, \ldots, y_{ny,2}) = (x_{0,2}, x_{1,2}, \ldots, x_{nx,2}, y_{0,2}, y_{1,2}, \ldots, y_{ny,2}) + (x_{0,1}, x_{1,1}, \ldots, x_{nx,1}, y_{0,1}, y_{1,1}, \ldots, y_{ny,1})$$

for all $(x_{0,1}, x_{1,1}, \ldots, x_{nx,1}, y_{0,1}, y_{1,1}, \ldots, y_{ny,1}) \in EC^{nx+ny+2}$ and for all $(x_{0,2}, x_{1,2}, \ldots, x_{nx,2}, y_{0,2}, y_{1,2}, \ldots, y_{ny,2}) \in BC^{nx+ny+2}$. This commutivity satisfies axiom (iii) above.

There are two primary cases that need to be considered for the computation of point addition for $(EC^{nx+ny+2}, +)$: (A) for at least one $j \in S_{nx}$, $x_{j,1} \neq x_{j,2}$; and (B) for all $j \in S_{nx}$, $x_{j,1} = x_{j,2} = x_{j,0}$. Case B includes three sub-cases:

i. for all $k \in S_{ny} y_{k,2} = y_{k,2}$, that is:

$$(x_{0,1}, x_{1,1}, \ldots, x_{nx,1}, y_{0,1}, y_{1,1}, \ldots, y_{ny,1}) = (x_{0,2}, x_{1,2}, \ldots, x_{nx,2}, y_{0,2}, y_{1,2}, \ldots, y_{ny,2}),$$

which corresponds to point doubling;

ii. for $k \in S_{ny}$ & $k \neq 0$, $y_{k,1} = y_{k,2}$, and where $y_{0,1}$ & $y_{0,2}$ are the roots of the following quadratic equation in $y_0$:

$$a_{10} y_0^2 + \sum_{k \in S_{ny}, k \neq 0} a_{1k} y_{k,1}^2 + y_0 \left\{ \sum_{k \in S_{ny}, k \neq 0} a_{2k0} y_{k,1} + \sum_{l \in S_{ny}, l \neq 0} a_{20l} y_{l,1} \right\} + \sum_{k, l \in S_{ny}, l \neq k, l \& k \neq 0} a_{2kl} y_{k,1} y_{l,1} + a_{30} y_0 + \sum_{k \in S_{ny}, k \neq 0} a_{3k} y_{k,1} + y_0^2 \sum_{i \in S_{nx}} c_{100i} x_{i,1} + y_0 \left\{ \sum_{k \in S_{ny}, i \in S_{nx}} c_{1k0i} y_{k,1} x_{i,1} + \sum_{l \in S_{ny}, i \in S_{nx}} c_{10li} y_{l,1} x_{i,1} \right\} + \sum_{k, l \in S_{ny}, l \& k \neq 0, i \in S_{nx}} c_{1kli} y_{k,1} y_{l,1} x_{i,1} + y_0 \sum_{l \in S_{nx}} c_{20l} x_{l,1} + \sum_{k \in S_{ny}, k \neq 0, l \in S_{nx}} c_{2kl} y_{k,1} x_{l,1} + y_0 \sum_{l, i \in S_{nx}} c_{30li} x_{l,1} x_{i,1} + \sum_{k \in S_{ny}, k \neq 0, l, i \in S_{nx}} c_{3kli} y_{k,1} x_{l,1} x_{i,1} = \sum_{l \in S_{nx}} b_{1l} x_{l,1}^3 + \sum_{l, k \in S_{nx}, l \neq k} b_{2lk} x_{l,1}^2 x_{k,1} + \sum_{l, k \in S_{nx}} b_{3lk} x_{l,1} x_{k,1} + \sum_{k \in S_{nx}} b_{4k} x_{k,1} + b_c,$$

which corresponds to point inverse; and iii. all other conditions except those in Cases B.i and B.ii. This case occurs only when ny is greater than or equal to one.

For Case A, for at least one $j \in S_{nx} x_{j,1} \neq x_{j,2}$, a straight line in (nx+ny+2)-dimensional space is defined by $$\frac{y_k - y_{k,1}}{y_{k,2} - y_{k,1}} = \frac{x_j - x_{j,1}}{x_{j,2} - x_{j,1}},$$

$k \in S_{ny}$ and $j \in S_{nx}$ and $$\frac{x_i - x_{i,1}}{x_{i,2} - x_{i,1}} = \frac{x_j - x_{j,1}}{x_{j,2} - x_{j,1}},$$

$i \neq j, i \in S_{nx}$.

For this case, $y_k = m_{yk}x_j + c_{yk}$, where $$m_{yk} = \frac{y_{k,2} - y_{k,1}}{x_{j,2} - x_{j,1}}$$

and $c_{yk} = y_{k,1} - x_{j,1}m_{yk}$. Further, $x_i = m_{xi}x_j + c_{xi}$, where $$m_{xi} = \frac{x_{i,2} - x_{i,1}}{x_{j,2} - x_{j,1}}$$

and $c_{xi} = x_{i,1} - x_{j,1}m_{xi}$. Equation (1) can then be re-written as:

$$\sum_{k \in S_{ny}} a_{1k} y_k^2 + \sum_{k,l \in S_{ny}, l \neq k} a_{2kl} y_k y_l + \sum_{k \in S_{ny}} a_{3k} y_k +$$
$$x_j \sum_{k,l \in S_{ny}} c_{1klj} y_k y_l + \sum_{k,l \in S_{ny}, i \in S_{nx}, i \neq j} c_{1kli} y_k y_l x_i + x_j \sum_{k \in S_{ny}} c_{2kj} y_k +$$
$$\sum_{k \in S_{ny}, l \in S_{nx}, l \neq j} c_{2kl} y_k x_l + x_j^2 \sum_{k \in S_{ny}} c_{3kjj} y_k + x_j \sum_{k \in S_{ny}, l \in S_{nx}, l \neq j} c_{3klj} y_k x_l +$$
$$x_j \sum_{k \in S_{ny}, i \in S_{nx}, i \neq j} c_{3kji} y_k x_i + \sum_{k \in S_{ny}, l, i \in S_{nx}, l \& i \neq j} c_{3kli} y_k x_l x_i =$$
$$b_{1j} x_j^3 + \sum_{l \in S_{nx}, l \neq j} b_{1l} x_l^3 + x_j^2 \sum_{k \in S_{nx}, k \neq j} b_{2jk} x_k + x_j \sum_{l \in S_{nx}, l \neq j} b_{2lj} x_l^2 +$$
$$\sum_{l,k \in S_{nx}, l,k \neq j, l \neq k} b_{2lk} x_l^2 x_k + b_{3jj} x_j^2 + x_j \sum_{k \in S_{nx}, k \neq j} b_{3jk} x_k +$$
$$x_j \sum_{l \in S_{nx}, l \neq j} b_{3lj} x_l + \sum_{l,k \in S_{nx}, l,k \neq j} b_{3lk} x_l x_k + b_{4j} x_j + \sum_{k \in S_{nx}, k \neq j} b_{4k} x_k + b_c,$$

and substitution of the above into the rewritten equation (1) for $y_k$, $k \in S_{ny}$, and $x_i$, $i \in S_{nx}$ & $i \neq j$, results in:

$$\sum_{k \in S_{ny}} a_{1k}(m_{yk}x_j + c_{yk})^2 + \sum_{k,l \in S_{ny}, l \neq k} a_{2kl}(m_{yk}x_j + c_{yk})(m_{yl}x_j + c_{yl}) +$$
$$\sum_{k \in S_{ny}} a_{3k}(m_{yk}x_j + c_{yk}) + x_j \sum_{k,l \in S_{ny}} c_{1klj}(m_{yk}x_j + c_{yk})(m_{yl}x_j + c_{yl}) +$$
$$\sum_{k,l \in S_{ny}, i \in S_{nx}, i \neq j} c_{1kli}(m_{yk}x_j + c_{yk})(m_{yl}x_j + c_{yl})(m_{xi}x_j + c_{xi}) +$$
$$x_j \sum_{k \in S_{ny}} c_{2kj}(m_{yk}x_j + c_{yk}) + \sum_{k \in S_{ny}, l \in S_{nx}, l \neq j} c_{2kl}(m_{yk}x_j + c_{yk})(m_{xl}x_j + c_{xl}) +$$
$$x_j^2 \sum_{k \in S_{ny}} c_{3kjj}(m_{yk}x_j + c_{yk}) +$$
$$x_j \sum_{k \in S_{ny}, l \in S_{nx}, l \neq j} c_{3klj}(m_{yk}x_j + c_{yk})(m_{xl}x_j + c_{xl}) +$$
$$x_j \sum_{k \in S_{ny}, i \in S_{nx}, i \neq j} c_{3kji}(m_{yk}x_j + c_{yk})(m_{xi}x_j + c_{xi}) +$$
$$\sum_{k \in S_{ny}, l, i \in S_{nx}, l \& i \neq j} c_{3kli}(m_{yk}x_j + c_{yk})(m_{xl}x_j + c_{xl})(m_{xi}x_j + c_{xi}) =$$
$$b_{1j} x_j^3 + \sum_{l \in S_{nx}, l \neq j} b_{1l}(m_{xl}x_j + c_{xl})^3 + x_j^2 \sum_{k \in S_{nx}, k \neq j} b_{2jk}(m_{xk}x_j + c_{xk}) +$$
$$x_j \sum_{l \in S_{nx}, l \neq j} b_{2lj}(m_{xl}x_j + c_{xl})^2 +$$
$$\sum_{l,k \in S_{nx}, l\&k \neq j, l \neq k} b_{2lk}(m_{xl}x_j + c_{xl})^2(m_{xk}x_j + c_{xk}) + b_{3jj} x_j^2 +$$
$$x_j \sum_{k \in S_{nx}, k \neq j} b_{3jk}(m_{xk}x_j + c_{xk}) + x_j \sum_{l \in S_{nx}, l \neq j} b_{3lj}(m_{xl}x_j + c_{xl}) +$$
$$\sum_{l,k \in S_{nx}, l\&k \neq j} b_{3lk}(m_{xl}x_j + c_{xl})(m_{xk}x_j + c_{xk}) +$$
$$b_{4j} x_j + \sum_{k \in S_{nx}, k \neq j} a_{6k}(m_{xk}x_j + c_{xk}) + b_c$$

Expanding the terms in the above equation leads to a cubic equation in $x_j$, $C_3 x_j^3 + C_2 x_j^2 + C_1 x_j + C_0 = 0$, where $C_3$, $C_2$, $C_1$ & $C_0$ are obtained from the above equation.

Assuming $C_3 \neq 0$, the above cubic equation in $x_j$ has three roots $x_{j,1}$, $x_{j,2}$, & $x'_{j,3}$ and can be written as $(x_j - x_{j,1})(x_j - x_{j,2})(x_j - x'_{j,3}) = 0$. Normalizing by the coefficient of $x^3$ and equating the coefficients of $x^2$ in the resulting equation with that in $(x_j - x_{j,1})(x_j - x_{j,2})(x_j - x'_{j,3}) = 0$, one obtains a solution for $x'_{j,3}$:

$$x'_{j,3} = \frac{-C_2}{C_3} - x_{j,1} - x_{j,2}. \qquad (2)$$

The values of $y'_{k,3}$, $k \in S_{ny}$ and $x'_{i,3}$, $i \in S_{nx}$ & $i \neq j$, may be similarly obtained from equations for $x_j = x'_{j,3}$.

For cases where $C_3 = 0$, $C_3 x_j^3 + C_2 x_j^2 + C_1 x_j + C_0 = 0$ becomes a quadratic equation. Such quadratic equations may be used in the definition of point equivalences.

With regard to Case B for all $j \in S_{nx}$, $x_{j,1} = x_{j,2}$, the three sub-cases are considered below. In all cases, $x_{j,o}$ is defined as $x_{j,o} = x_{j,1} = x_{j,2}$, $j \in S_{nx}$.

For Case B.i., all $k \in S_{ny}$, $y_{k,1} = y_{k,2}$, which corresponds to point doubling. In this case, $(x_{0,1}, x_{1,1}, \ldots, x_{nx,1}, y_{0,1}, y_{1,1}, \ldots, y_{ny,1}) = (x_{0,2}, x_{1,2}, \ldots, x_{nx,2}, y_{0,2}, y_{1,2}, \ldots, y_{ny,2})$.
Letting:

$$(x_{0,o}, x_{1,o}, \ldots, x_{nx,o}, y_{0,o}, y_{1,o}, \ldots, y_{ny,o}) =$$
$$(x_{0,1}, x_{1,1}, \ldots, x_{nx,1}, y_{0,1}, y_{1,1}, \ldots, y_{ny,1}) =$$
$$(x_{0,2}, x_{1,2}, \ldots, x_{nx,2}, y_{0,2}, y_{1,2}, \ldots, y_{ny,2})$$

the sum is written as $$(x_{0,3}, x_{1,3}, \ldots, x_{nx,3}, y_{0,3}, y_{1,3}, \ldots, y_{ny,3}) =$$
$$(x_{0,o}, x_{1,o}, \ldots, x_{nx,o}, y_{0,o}, y_{1,o}, \ldots, y_{ny,o}) +$$
$$(x_{0,o}, x_{1,o}, \ldots, x_{nx,o}, y_{0,o}, y_{1,o}, \ldots, y_{ny,o}) \qquad (3).$$

There are several ways of defining the addition in this case. Three possible rules are described below. Case B.i.1: Letting $S_{nx,Lx}$ denote a subset of $S_{nx}$ with Lx elements, i.e., $S_{nx,Lx} \subseteq S_{nx}$; letting $S_{ny,Ly}$ denote a subset of $S_{ny}$ with Ly elements and which does not include the element 0; i.e. $S_{ny,Ly} \subseteq S_{ny}$ and $0 \notin S_{ny,Ly}$; setting the value of Lx and Ly as at least one, then the straight line in this case can be defined as a tangent to the point $(x_{0,o}, x_{1,o}, \ldots, x_{nx,o}, y_{0,o}, y_{1,o}, \ldots, y_{ny,o})$ defined in a sub-dimensional space with coordinates $y_n$ and $x_m$ with $n \in S_{ny,Ly}$ and $m \in S_{nx,Lx}$.

In this case, the gradients $m_{yn}$ and $m_{xm}$ of the straight line to be used in equation (2) are essentially the first derivatives of $y_n$ and $x_m$, $n \in S_{ny,LY}$ and $m \in S_{nx,Lx}$, for F with respect to $x_j$, $j \in S_{nx,Lx}$, i.e., $$m_{yn} = \frac{dy_n}{dx_j} \text{ and } m_{xn} = \frac{dx_m}{dx_j}.$$

Using these derivatives for the values of the gradients, $$m_{yn} = \frac{dy_n}{dx_j},$$

where $n \in S_{ny,Ly}$, and $$m_{xn} = \frac{dx_m}{dx_j},$$

where $m \in S_{nx,Lx}$, in equation (2) and noting that it is assumed that $$\frac{dx_m}{dx_j} = 0,$$

for $m \in (S_{nx} - S_{nx,Lx})$ and $$\frac{dy_n}{dx_j} = 0,$$

for $n \in (S_{ny} - S_{ny,Lx})$, then a solution for $x'_{j,3}$ may be obtained.

The values of $y'_{n,3}$ for $n \in S_{ny}$ and $x'_{m,3}$ for $m \in S_{nx}$ & m—j, can further be obtained for $x_j = x'_{j,3}$. The choice of the $x_m$-coordinates, $m \in S_{nx,Lx}$ and $y_n$-coordinates, $n \in S_{ny,Ly}$, which can be used to compute the tangent of the straight line in this case may be chosen at random or according to a pre-defined rule. Further, a different choice of the $x_m$-coordinates, $m \in S_{nx,Lx}$, and $y_n$-coordinates, $n \in S_{ny,Ly}$, may be made when one needs to compute successive point doublings, such as that needed in scalar multiplication.

With regard to the next case, Case B.i.2, the second possible way of defining the addition of a point with itself is to apply a sequence of the point doublings according to the rule defined above in Case B.i.1, where the rule is applied with a different selection of the x-coordinate(s) and y-coordinates(s) in each step of this sequence.

In the third sub-case, Case B.i.3, a point is substituted with one of its equivalents. Letting $(x_{0,oe}, x_{1,oe}, \ldots, x_{nx,oe}, y_{0,oe}, y_{1,oe}, \ldots, y_{ny,oe}))$ represent the equivalent point of $(x_{0,o}, x_{1,o}, \ldots, x_{nx,o}, y_{0,o}, y_{1,o}, \ldots, y_{ny,o}))$ then equation (3) may be written as:

$$(x_{0,3}, x_{1,3}, \ldots, x_{nx,3}, y_{0,3}, y_{1,3}, \ldots, y_{ny,3}) + \\ (x_{0,o}, x_{1,o}, \ldots, x_{nx,o}, y_{0,o}, y_{1,o}, \ldots, y_{ny,o}) + \\ (x_{0,oe}, x_{1,oe}, \ldots, x_{nx,oe}, y_{0,oe}, y_{1,oe}, \ldots, y_{ny,oe}).$$

With regard to Case B.ii, for $k \in S_{ny}$ & $k \neq 0$, $y_{k,1} = y_{k,2}$, and where $y_{0,1}$ & $y_{0,2}$ are the roots of the quadratic equation in $y_0$, this case corresponds to generation of the point inverse.

Letting $y_{k,1} = y_{k,2} = y_{k,o}$ for $k \in S_{ny}$ & $k \neq 0$, then any two points, such as the point $(x_{0,o}, x_{1,o}, \ldots, x_{nx,o}, y_{0,1}, y_{1,o}, \ldots, y_{ny,o})) \in EC^{nx+ny+2}$ and the point $(x_{0,o}, x_{1,o}, \ldots, x_{nx,o}, y_{0,2}, y_{1,o}, \ldots, y_{ny,o}) \in EC^{nx+ny+2}$, are in the hyper-plane with $x_i = x_{i,o}$, $i \in S_{nx}$ and $y_k = y_{k,o}$, $k \in S_{ny}$ & $k \neq 0$. Thus, any straight line joining these two points such that $(x_{0,o}, x_{1,o}, \ldots, x_{nx,o}, y_{0,1}, y_{1,o}, \ldots, y_{ny,o}) \neq (x_{0,o}, x_{1,o}, \ldots, x_{nx,o}, y_{0,2}, y_{1,o}, \ldots, y_{ny,o})$ is also in this hyper-plane.

Substituting the values of $x_{0,o}, x_{1,o}, \ldots, x_{nx,o}, y_{1,o}, \ldots,$ & $y_{ny,o}$ in an elliptic polynomial equation with multiple x-coordinates and multiple y-coordinates, a quadratic equation for $y_0$ is obtained, as given above. Thus, $y_0$ has only two solutions, $y_{0,1}$ & $y_{0,2}$.

Thus, a line joining points $(x_{0,o}, x_{1,o}, \ldots, x_{nx,o}, y_{0,1}, y_{1,o}, \ldots, y_{ny,o}) \in EC^{nx+ny+2}$ and $(x_{0,o}, x_{1,o}, \ldots, x_{nx,o}, y_{0,2}, y_{1,o}, \ldots, y_{ny,o}) \in EC^{nx+ny+2}$ does not intersect with $EC^{nx+ny+2}$ at a third point.

A line that joins these two points is assumed to intersect with $EC^{nx+ny+2}$ at infinity $(x_{0,1}, x_{1,1}, \ldots, x_{nx,1}, y_{0,1}, y_{1,1}, \ldots, y_{ny,1}) \in EC^{nx+ny+2}$. This point at infinity is used to define both the inverse of a point in $EC^{nx+ny+2}$ and the identity point. According to the addition rule defined above, one can write:

$$(x_0, x_1, \ldots, x_{nx}, y_{0,1}, y_1, \ldots, y_{ny}) + \\ (x_0, x_1, \ldots, x_{nx}, y_{0,2}, y_1, \ldots, y_{ny}) = \\ (x_{0,1}, x_{1,1}, \ldots, x_{nx,1}, y_{0,1}, y_{1,1}, \ldots, y_{ny,1}) \quad (4),$$

since the third point of intersection of such lines is assumed to be at infinity, $(x_{0,I}, x_{1,I}, \ldots, x_{nx,I}, y_{0,I}, y_{1,I}, \ldots, y_{ny,I}) \in EC^{nx+ny+2}$. Thus, this equation defines a unique inverse for any point $(x_0, x_1, \ldots, x_{nx}, y_0, y_1, \ldots, y_{ny}) \in EC^{nx+ny+2}$, namely:

$$-(x_0, x_1, \ldots, x_{nx}, y_{0,1}, y_1, \ldots, y_{ny}) = (x_0, x_1, \ldots, x_{nx}, y_{0,2}, y_1, \ldots, y_{ny}).$$

Thus, equation (4) can be written as:

$$(x_0, x_1, \ldots, x_{nx}, y_{0,1}, y_1, \ldots, y_{ny}) - \\ (x_0, x_1, \ldots, x_{nx}, y_{0,1}, y_1, \ldots, y_{ny}) = \\ (x_{0,I}, x_{1,I}, \ldots, x_{nx,I}, y_{0,I}, y_{1,I}, \ldots, y_{ny,I}) \quad (5).$$

Further, a line joining the point at infinity $(x_{0,I}, x_{1,I}, \ldots, x_{nx,I}, y_{0,I}, y_{1,I}, \ldots, y_{ny,I}) \in EC^{nx+ny+2}$ and a point $(x_0, x_1, \ldots, x_{nx}, y_{0,1}, y_1, \ldots, y_{ny}) \in EC^{nx+ny+2}$ will intersect with $EC^{nx+ny+2}$ at $(x_0, x_1, \ldots, x_{nx}, y_{0,2}, y_1, \ldots, y_{ny}) \in EC^{nx+ny+2}$. Thus, from the addition rule defined above, $$(x_0, x_1, \ldots, x_{nx}, y_{0,1}, y_2, \ldots, y_{ny}) + \\ (x_{0,I}, x_{1,I}, \ldots, x_{nx,I}, y_{0,I}, y_{1,I}, \ldots, y_{ny,I}) = \\ (x_0, x_1, \ldots, x_{nx}, y_{0,1}, y_1, \ldots, y_{ny}) \quad (6).$$

Equation (5) satisfies axiom (ii) while equation (6) satisfies axiom (i), defined above.

Case B.iii applies for all other conditions except those in cases B.i and B.ii. This case occurs only when ny is greater than or equal to one. Given two points $(x_{0,o}, x_{1,o}, \ldots, x_{nx,o}, y_{0,1}, y_{1,1}, \ldots, y_{ny,1}) \in EC^{nx+ny+2}$ and $(x_{0,o}, x_{1,o}, \ldots, x_{nx,o}, y_{0,2}, y_{1,2}, \ldots, y_{ny,2}) \in EC^{nx+ny+2}$ that do not satisfy the conditions of cases B.i and B.ii above, the sum point is written as $(x_{0,3}, x_{1,3}, \ldots, x_{nx,3}, y_{0,3}, y_{1,3}, \ldots, y_{ny,3}) = (x_{0,o}, x_{1,o}, \ldots, x_{nx,o}, y_{0,1}, y_{1,1}, \ldots, y_{ny,1}) + (x_{0,o}, x_{1,o}, \ldots, x_{nx,o}, y_{0,2}, y_{1,2}, \ldots, y_{ny,2})$.

There are several possible rules to find the sum point in this case. Three possible methods are given below.

1) Using three point doublings and one point addition, $$(x_{0,3}, x_{1,3}, \ldots, x_{nx,3}, y_{0,3}, y_{1,3}, \ldots, y_{ny,3})4 = \\ (x_{0,o}, x_{1,o}, \ldots, x_{nx,o}, y_{0,1}, y_{1,1}, \ldots, y_{ny,1}) - \\ 2(x_{0,o}, x_{1,o}, \ldots, x_{nx,o}, y_{0,2}, y_{1,2}, \ldots, y_{ny,2});$$

2) using one point doublings and three point additions, $$(x_{0,3}, x_{1,3}, \ldots, x_{nx,3}, y_{0,3}, y_{1,3}, \ldots, y_{ny,3}) = \\ (2(x_{0,o}, x_{1,o}, \ldots, x_{nx,o}, y_{0,1}, y_{1,1}, \ldots, y_{ny,1}) + \\ (x_{0,o}, x_{1,o}, \ldots, x_{nx,o}, y_{0,2}, y_{1,2}, \ldots, y_{ny,2})) - \\ (x_{0,o}, x_{1,o}, \ldots, x_{nx,o}, y_{0,1}, y_{1,1}, \ldots, y_{ny,1}); \text{ and}$$

3) using point equivalence, $$(x_{0,3}, x_{1,3}, \ldots, x_{nx,3}, y_{0,3}, y_{1,3}, \ldots, y_{ny,3}) = \\ (x_{0,o}, x_{1,o}, \ldots, x_{nx,o}, y_{0,1}, y_{1,1}, \ldots, y_{ny,1}) + \\ (x_{0,oe}, x_{1,oe}, \ldots, x_{nx,oe}, y_{0,2e}, y_{1,2e}, \ldots, y_{ny,2e}),$$

where $(x_{0,oe}, x_{1,oe}, \ldots, x_{nx,oe}, y_{0,2e}, y_{1,2e}, \ldots, y_{ny,2e})$ is assumed to be the equivalent point of $(x_{0,o}, x_{1,o}, \ldots, x_{nx,o}, y_{0,2}, y_{1,2}, \ldots, y_{ny,2})$.

It should be noted that the above methods for defining the sum point are not the only ones that can be defined and are provided for exemplary purposes only. The choice of method used to obtain the sum point in this case should depend on the computation complexity of point addition and point doubling.

With regard to associativity, one way of proving associativity of $(EC^{nx+ny+2}, +)$ is as follows: Given particular elliptic polynomial equations (i.e., for particular coefficients $a_{1l}$, $a_{2kl}$, $a_{3k}$, $c_{1lki}$, $c_{2kl}$, $c_{3kli}$, $b_{1l}$, $b_{2lk}$, $b_{3lk}$, $b_{4k}$, $b_c \in F$) defined over a finite field F, if it can be shown by computation that any point $Q \in EC^{nx+ny+2}$ (and any of its equivalent points) can be uniquely written as $k_Q P \in EC^{nx+ny+2}$, where P is the generator point of $(EC^{nx+ny+2}, +)$, then the corresponding $EC^{nx+ny+2}$ groups based on such polynomials are associative. This is because any three points $Q,R,S \in EC^{nx+ny+2}$ (or any of their equivalent points) can be written as $k_Q P, k_R P, k_S P \in EC^{nx+ny+2}$, respectively, thus their sum $(Q+R+S)=(k_Q P+k_R P+k_S P)=(k_Q+k_R+k_S)P$ can be carried out in any order.

The following elliptic polynomial equation with nx=1 and ny=0 is used to show an example of the equations in Case A used in point addition: $y_0^2 = x_0^2 + x_1^3 + x_0 x_1$. Choosing $x_j = x_0$, and substituting $y_k = m_{yk} x_j + c_{yk}$ from Case A above for $y_0$, and the corresponding equation $x_i = m_{xi} x_j + c_{xi}$ for $x_l$, one obtains $(m_{y0} x_0 + c_{y0})^2 = x_0^3 + (m_{x1} x_0 + c_{x1})^3 + x_0 (m_{x1} x_0 + c_{x1})$.

Expanding this equation yields the equation $m_{y0}^2 x_0^2 + 2m_{y0} c_{y0} x_0 + c_{y0}^2 = x_0^3 + m_{x1}^3 x_0^3 + 3m_{x1}^2 c_{x1} x_0^2 + 3m_{x1} c_{x1}^2 x_0 + c_{x1}^3 + m_{x1} x_0^2 + c_{x1} x_0$, or $(1+m_{x1}^3) x_0^3 + (3m_{x1}^2 c_{x1} + m_{x1} - m_{y0}^2) x_0^2 + (3m_{x1} c_{x1}^2 + c_{x1} - 2m_{y0} c_{y0}) x_0 + c_{x1}^3 - c_{y0}^2 = 0$. From equation (2), the solution for $x'_{0,3}$ in this case is obtained:

$$x'_{0,3} = \frac{-(3m_{x1}^2 c_{x1} + m_{x1} - m_{y0}^2)}{(1+m_{x1}^3)} - x_{j,1} - x_{j,2}.$$

Similarly, one can obtain the values of $y'_{0,3}$ and $x'_{1,3}$ for $x_0 = x'_{0,3}$.

It should be noted that when $m_{x1} = -1$, the coefficient of the cubic term in the above is zero; i.e. $C_3 = 0$. In this case, the resulting quadratic equation can be used in the definition of point equivalences for the points that satisfy the elliptic polynomial equation.

Each of the equations for point addition and point doublings derived for cases A and B above require modular inversion or division. In cases where field inversions or divisions are significantly more expensive (in terms of computational time and energy) than multiplication, projective coordinates are used to remove the requirement for field inversion or division from these equations.

Several projective coordinates can be utilized. In the preferred embodiment, the Jacobean projective coordinate system is used. As an example, we examine:

$$x_i = \frac{X_i}{V^2} \quad \text{for } i \in S_{nx}; \text{ and} \quad (7)$$

$$y_k = \frac{Y_k}{V^3} \quad \text{for } k \in S_{ny}. \quad (8)$$

Using Jacobian projection yields:

$$\sum_{k \in S_{ny}} a_{1k} \frac{Y_k^2}{V^6} + \sum_{k,l \in S_{ny}, l \neq k} a_{2kl} \frac{Y_k}{V^3} \frac{Y_l}{V^3} + \sum_{k \in S_{ny}} a_{3k} \frac{Y_k}{V^3} + \quad (9)$$

-continued $$\sum_{k,l \in S_{ny}, i \in S_{nx}} c_{1kli} \frac{Y_k}{V^3} \frac{Y_l}{V^3} \frac{X_i}{V^2} + \sum_{k \in S_{ny}, l \in S_{nx}} c_{2kl} \frac{Y_k}{V^3} \frac{X_l}{V^2} +$$

$$\sum_{k \in S_{ny}, l, i \in S_{nx}} c_{3kli} \frac{Y_k}{V^3} \frac{X_l}{V^2} \frac{X_i}{V^2} = \sum_{l \in S_{nx}} b_{1l} \frac{X_l^3}{V^6} +$$

$$\sum_{l,k \in S_{nx}, l \neq k} b_{2lk} \frac{X_l^2}{V^4} \frac{X_k}{V^2} + \sum_{l,k \in S_{nx}} b_{3lk} \frac{X_l}{V^2} \frac{X_k}{V^2} + \sum_{k \in S_{nx}} b_{4k} \frac{X_k}{V^2} + b_c$$

which can be rewritten as:

$$\sum_{k \in S_{ny}} a_{1k} Y_k^2 V^2 + \sum_{k,l \in S_{ny}, l \neq k} a_{2kl} Y_k Y_l V^2 + \quad (10)$$

$$\sum_{k \in S_{ny}} a_{3k} Y_k V^5 + \sum_{k,l \in S_{ny}, i \in S_{nx}} c_{1kli} Y_k Y_l X_i +$$

$$\sum_{k \in S_{ny}, l \in S_{nx}} c_{2kl} Y_k X_l V^3 + \sum_{k \in S_{ny}, l, i \in S_{nx}} c_{3kli} Y_k X_l X_i V =$$

$$\sum_{l \in S_{nx}} b_{1l} X_l^3 V^2 + \sum_{l,k \in S_{nx}, l \neq k} b_{2lk} X_l^2 X_k V^2 +$$

$$\sum_{l,k \in S_{nx}} b_{3lk} X_l X_k V^4 + \sum_{k \in S_{nx}} b_{4k} X_k V^6 + b_c V^8.$$

In the following, the points $(X_0, X_1, \ldots, X_{nx}, Y_0, Y_1, \ldots, Y_{ny}, V)$ are assumed to satisfy equation (10). When $V \neq 0$, the projected point $(X_0, X_1, \ldots, X_{nx}, Y_0, Y_1, \ldots, Y_{ny}, V)$ corresponds to the point:

$$(x_0, x_1, \ldots, x_{nx}, y_0, y_1, \ldots, y_{ny}) = \left( \frac{X_0}{V^2}, \frac{X_1}{V^2}, \ldots, \frac{X_{nx}}{V^2}, \frac{Y_0}{V^3}, \frac{Y_1}{V^3}, \ldots, \frac{Y_{ny}}{V^3} \right),$$

which satisfies equation (1).

Using Jacobean projective coordinates, equation (10) can be written as:

$$\left( \frac{X_{0,3}}{V_3^2}, \frac{X_{1,3}}{V_3^2}, \ldots, \frac{X_{nx,3}}{V_3^2}, \frac{Y_{0,3}}{V_3^3}, \frac{Y_{1,3}}{V_3^3}, \ldots, \frac{Y_{ny,3}}{V_3^3} \right) = \quad (11)$$

$$\left( \frac{X_{0,1}}{V_1^2}, \frac{X_{1,1}}{V_1^2}, \ldots, \frac{X_{nx,1}}{V_1^2}, \frac{Y_{0,1}}{V_1^3}, \frac{Y_{1,1}}{V_1^3}, \ldots, \frac{Y_{ny,1}}{V_1^3} \right) +$$

$$\left( \frac{X_{0,2}}{V_2^2}, \frac{X_{1,2}}{V_2^2}, \ldots, \frac{X_{nx,2}}{V_2^2}, \frac{Y_{0,2}}{V_2^3}, \frac{Y_{1,2}}{V_2^3}, \ldots, \frac{Y_{ny,2}}{V_2^3} \right).$$

By using Jacobian projective coordinates in the equations of Cases A and B above, and by an appropriate choice of the value of $V_3$, it can be shown that point doubling and point addition can be computed without the need for field inversion or division.

As described above, conventional bit string embedding into an elliptic curve point involves an iterative algorithm to search for an x-coordinate value which will lead to a quadratic residue value of the y-coordinate starting from an initial x-coordinate value specified by the bit string to be embedded. However, such a process requires that the number of iterations needed is different for different bit strings that are being embedded. In the present method, an embedding methodology is utilized that embeds a bit string into an appropriate elliptic polynomial point with (nx+1) x-coordinates and (ny+1) y-coordinates in a deterministic and non-iterative manner. Further, the elliptic polynomial equation is of a specified form, i.e., it is isomorphic to its twist. This method circumvents the need for an iterative algorithm that involves the usual search for a quadratic residue value of the y-coordinate (which typically requires several iterations) and, further, suffers from the drawback that the number of iterations needed is different for different bit strings that are being embedded.

In order to examine the embedding method, the twist of an elliptic polynomial equation needs to be defined. Given an elliptic polynomial with (nx+1) x-coordinates and (ny+1) y-coordinates of the form described above:

$$y_0^2 + \sum_{k \in S_{ny}} a_{1k} y_k^2 + \sum_{k,l \in S_{ny}, l \neq k} a_{2kl} y_k y_l = \sum_{l \in S_{nx}} b_{1l} x_l^3 + \sum_{l,k \in S_{nx}, l \neq k} b_{2lk} x_l^2 x_k, \quad (12)$$

where $a_{1l}, a_{2kl}, b_{1l}, b_{2lk} \in F$.

Given certain values for the x-coordinates $x_{0,o}, x_{1,o}, \ldots, x_{nx,o}$ and y-coordinates $y_{1,o}, \ldots, y_{ny,o}$, respectively, that are elements of the finite field, F, these values are substituted into the elliptic polynomial equation (1) in order to obtain a quadratic equation in $y_0$:

$$y_0^2 = -\sum_{k \in S_{ny}} a_{1k} y_{k,o}^2 - \sum_{k,l \in S_{ny}, l \neq k} a_{2kl} y_{k,o} y_{l,o} +$$

$$\sum_{l \in S_{nx}} b_{1l} x_{l,o}^3 + \sum_{l,k \in S_{nx}, l \neq k} b_{2lk} x_{l,o}^2 x_{k,o} = T.$$

If a solution of the above quadratic equation (i.e., $y_0^2 = T$) is an element of the finite field F, the point $(x_{0,o}, x_{1,o}, \ldots, x_{nx,o}, y_0, y_{1,o}, \ldots, y_{ny,o})$ is said to satisfy the given elliptic polynomial equation. If a solution of the above quadratic equation is not an element of the finite field F, the point $(x_{0,o}, x_{1,o}, \ldots, x_{nx,o}, y_0, y_{1,o}, \ldots, y_{ny,o})$ is said to satisfy the twist of the given elliptic curve equation. The inventive embedding method is based on the isomorphic relationship between a curve and its twist as described in the following theorem:

An elliptic polynomial equation of the form given above is isomorphic to its twist if:
1) there are mathematical mappings that can be defined on the values of $x_0, x_1, \ldots, x_{nx}, y_1, \ldots, y_{ny}$ (i.e., $\phi_x(x_i)$ and $\phi_y(y_i)$) such that any point $(x_0, x_1, \ldots, x_{nx}, y_0, y_1, \ldots, y_{ny})$ that satisfies such an elliptic polynomial equation can be mapped into another point $(\phi_x(x_0), \phi_x(x_1), \ldots, \phi_x(x_{xn}), \phi_y(y_0), \phi_y(y_1), \ldots, \phi_y(y_{ny}))$ that satisfies the twist of the same elliptic polynomial equation; and
2) the mapping between the points $(x_0, x_1, \ldots, x_{nx}, y_0, y_1, \ldots, y_{ny})$ and $(\phi_x(x_0), \phi_x(x_1), \ldots, \phi_x(x_{xn}), \phi_y(y_0), \phi_y(y_1), \ldots, \phi_y(y_{ny}))$ is unique, i.e., a one-to-one correspondence.

The proof of this theorem is as follows. Re-writing equation (12) as:

$$y_0^2 = \quad (13),$$
$$-\sum_{k \in S_{ny}} a_{1k} y_k^2 - \sum_{k,l \in S_{ny}, l \neq k} a_{2kl} y_k y_l + \sum_{l \in S_{nx}} b_{1l} x_l^3 + \sum_{l,k \in S_{nx}, l \neq k} b_{2lk} x_l^2 x_k,$$

and letting the right-hand side of equation (13) be denoted as T, then:

$$T = -\sum_{k \in S_{ny}} a_{1k} y_k^2 - \sum_{k,l \in S_{ny}, l \neq k} a_{2kl} y_k y_l + \sum_{l \in S_{nx}} b_{1l} x_l^3 + \sum_{l,k \in S_{nx}, l \neq k} b_{2lk} x_l^2 x_k. \quad (14)$$

Thus, any value of $x_0, x_1, \ldots, x_{nx}, y_1, \ldots, y_{ny}$ will lead to a value of $T \in F(p)$. T could be quadratic residue or non-quadratic residue. If T is quadratic residue, then equation (14) is written as:

$$T_q = -\sum_{k \in S_{ny}} a_{1k} y_{k,q}^2 - \sum_{k,l \in S_{ny}, l \neq k} a_{2kl} y_{k,q} y_{l,q} + \quad (15)$$

$$\sum_{l \in S_{nx}} b_{1l} x_{l,q}^3 + \sum_{l,k \in S_{nx}, l \neq k} b_{2lk} x_{l,q}^2 x_{k,q}$$

where $x_{0,q}, x_{1,q}, \ldots, x_{nx,q}, y_{1,q}, \ldots, y_{ny,q} \in F$ denotes the values of $x_0, x_1, \ldots, x_{nx}, y_1, \ldots, y_{ny}$ that result in a quadratic residue value of T, which is hereafter denoted as $T_q$.

If T is non-quadratic residue, then equation (14) is written as:

$$T_{\bar{q}} = -\sum_{k \in S_{ny}} a_{1k} y_{k,\bar{q}}^2 - \sum_{k,l \in S_{ny}, l \neq k} a_{2kl} y_{k,\bar{q}} y_{l,\bar{q}} + \quad (16)$$

$$\sum_{l \in S_{nx}} b_{1l} x_{l,\bar{q}}^3 + \sum_{l,k \in S_{nx}, l \neq k} b_{2lk} x_{l,\bar{q}}^2 x_{k,\bar{q}}$$

where $x_{0,\bar{q}}, x_{1,\bar{q}}, \ldots, x_{nx,\bar{q}}, y_{1,\bar{q}}, \ldots, y_{ny,\bar{q}} \in F$ denotes the values of $x_0, x_1, \ldots, x_{nx}, y_1, \ldots, y_{ny}$ that result in a non-quadratic residue value of T, denoted as $T_{\bar{q}}$.

Letting g be any non-quadratic residue number in F (i.e., $g \in F(p)$ & $\sqrt{g} \notin F(p)$), then multiplying equation (15) with $g^3$ yields:

$$g^3 T_q = -g^3 \sum_{k \in S_{ny}} a_{1k} y_{k,q}^2 - g^3 \sum_{k,l \in S_{ny}, l \neq k} a_{2kl} y_{k,q} y_{l,q} +$$

$$g^3 \sum_{l \in S_{nx}} b_{1l} x_{l,q}^3 + g^3 \sum_{l,k \in S_{nx}, l \neq k} b_{2lk} x_{l,q}^2 x_{k,q},$$

which can be re-written as:

$$g^3 T_q = \quad (17)$$
$$-\sum_{k \in S_{ny}} a_{1k} \left(\sqrt{g^3} y_{k,q}\right)^2 - \sum_{k,l \in S_{ny}, l \neq k} a_{2kl} g^3 \left(\sqrt{g^3} y_{k,q}\right)\left(\sqrt{g^3} y_{l,q}\right) +$$

$$\sum_{l \in S_{nx}} b_{1l} (g x_{l,q})^3 + \sum_{l,k \in S_{nx}, l \neq k} b_{2lk} (g x_{l,q})^2 (g x_{k,q}).$$

It should be noted that if g is non-quadratic residue, then $g^3$ is also non-quadratic residue. Further, the result of multiplying a quadratic residue number by a non-quadratic residue number is a non-quadratic residue number. Thus, $g^3 T_q$ is non-quadratic residue.

By comparing the terms of equations (16) and (17), we obtain the following mappings:

$$x_{i,\bar{q}} = g x_{i,q}; \quad (18);$$

$$y_{i,\bar{q}} = \sqrt{g^3} y_{i,q}; \quad (19); \text{ and}$$

$$T_{\bar{q}} = g^3 T_q \quad (20).$$

The mappings between the variables $x_{i,q}$ and $x_{i,\bar{q}}$ in equation (18), $y_{i,q}$ and $y_{i,\bar{q}}$ in equation (19), and $T_q$ and $T_{\bar{q}}$ in equation (20) are all bijective, i.e., there is a one-to-one correspondence from basic finite field arithmetic. As a consequence, the mappings between the (nx+ny+2)-tuple $(x_{0,q}, x_{1,q}, \ldots, x_{nx,q}, T_q, y_{1,q}, \ldots, y_{ny,q})$ and the (nx+ny+2)-tuple $(x_{0,\bar{q}}, x_{1,\bar{q}}, \ldots, x_{nx,\bar{q}}, T_{\bar{q}}, y_{1,\bar{q}}, \ldots, y_{ny,\bar{q}})$ are also bijective.

Therefore, for every solution of equation (15), there is an isomorphic solution that satisfies equation (16), and since the mappings of the coordinates of one to the other are given in equations (18)-(20), these two solutions are isomorphic with respect to each other.

Since $T_q$ is quadratic residue, this expression can be written as:

$$T_q = y_0^2. \tag{21}$$

Thus, from equation (20), $T_{\bar{q}}$ can be written as:

$$T_{\bar{q}} = g^3 y_0^2. \tag{22}$$

Using equations (21) and (22), equations (15) and (16) can be written as:

$$y_0^2 = -\sum_{k \in S_{ny}} a_{1k} y_{k,q}^2 - \sum_{k,l \in S_{ny}, l \neq k} a_{2kl} y_{k,q} y_{l,q} + \sum_{l \in S_{nx}} b_{1l} x_{l,q}^3 + \sum_{l,k \in S_{nx}, l \neq k} b_{2lk} x_{l,q}^2 x_{k,q}; \text{ and} \tag{23}$$

$$g^3 y_0^2 = -\sum_{k \in S_{ny}} a_{1k} y_{k,\bar{q}}^2 - \sum_{k,l \in S_{ny}, l \neq k} a_{2kl} y_{k,\bar{q}} y_{l,\bar{q}} + \sum_{l \in S_{nx}} b_{1l} x_{l,\bar{q}}^3 + \sum_{l,k \in S_{nx}, l \neq k} b_{2lk} x_{l,\bar{q}}^2 x_{k,\bar{q}}. \tag{24}$$

Since any solution of equation (15) has an isomorphic solution that satisfies equation (16), it follows that the solution of equation (23), denoted as $(x_{0,q}, x_{1,q}, \ldots, x_{nx,q}, y_0, y_{1,q}, \ldots, y_{ny,q})$ has an isomorphic solution that satisfies equation (24), denoted as $$\left(gx_{0,q}, gx_{1,q}, \ldots, gx_{nx,q}, g^{\frac{3}{2}} y_0, g^{\frac{3}{2}} y_{1,q}, \ldots, g^{\frac{3}{2}} y_{ny,q}\right).$$

The solutions of equation (23) form the points $(x_{0,q}, x_{1,q}, \ldots, x_{nx,q}, y_0, y_{1,q}, \ldots, y_{ny,q})$ that satisfy an elliptic polynomial. Similarly, the solutions of equation (24) form the points $$\left(gx_{0,q}, gx_{1,q}, \ldots, gx_{nx,q}, g^{\frac{3}{2}} y_0, g^{\frac{3}{2}} y_{1,q}, \ldots, g^{\frac{3}{2}} y_{ny,q}\right)$$

that satisfy its twist. This proves the above theorem.

An example of a mapping of the solutions of equation (23) defined over F(p), where p=3 mod 4, to the solutions of its twist is implemented by using $-x_i$ for the x-coordinates and $-y_i^2$ for the y-coordinates.

The isomorphism between an elliptic polynomial and its twist, discussed above, is exploited for the embedding of the bit sting of a shared secret key into the appropriate x and y coordinates of an elliptic polynomial point without the need for an iterative search for a quadratic residue value of the corresponding $y_0$-coordinate, which usually requires several iterations, where the number of iterations needed is different for different bit strings which are being embedded.

Assuming F=F(p) and that the secret key is an M-bit string such that (nx+ny+1)N>M>N−1, where N is the number of bits needed to represent the elements of F(p), then the secret key bit string is divided into (nx+ny+1) bit-strings $k_{x,0}, k_{x,1}, \ldots, k_{x,nx}, k_{y,1}, \ldots, k_{k,ny}$. The value of the bit-strings $k_{x,0}, k_{x,1}, \ldots, k_{x,nx}, k_{y,1}, \ldots, k_{k,ny}$ must be less than p. In the preferred embodiment of embedding the (nx+ny+1) bit-strings $k_{x,0}, k_{x,1}, \ldots, k_{x,nx}, k_{y,1}, \ldots, k_{k,ny}$, the embedding is as follows.

First, assign the value of the bit string of $k_{x,0}, k_{x,1}, \ldots, k_{x,nx}$ to $x_{0,k}, x_{1,k}, \ldots, x_{nx,k}$. Next, assign the value of the bit string of $k_{y,1}, \ldots, k_{k,ny}$ to $y_{1,k}, \ldots, y_{ny,k}$. Then, compute:

$$T^{(s-1)} = \sum_{l \in S_{nx}} b_{1l} x_l^3 + \sum_{l,k \in S_{nx}, l \neq k} b_{2lk} x_l^2 x_k.$$

Finally, use the Legendre test to see if T has a square root. If T has a square root, assign one of the roots to $y_0$; otherwise, the x-coordinates and y-coordinates of the elliptic polynomial point with the embedded shared secret key bit string are given by $gx_{i,k}$ and $$g^{\frac{3}{2}} y_{i,k},$$

respectively, where g is non-quadratic residue in F.

It should be noted that p is usually predetermined prior to encryption, so that the value of g can also be predetermined. Further, the receiver can identify whether the point $(x_{0,k}, x_{1,k}, \ldots, x_{nx,k}, y_{0,k}, y_{1,k}, \ldots, y_{ny,k})$ or the point $$\left(gx_{0,k}, gx_{1,k}, \ldots, gx_{nx,k}, g^{\frac{3}{2}} y_{0,k}, g^{\frac{3}{2}} y_{1,k}, \ldots, g^{\frac{3}{2}} y_{ny,k}\right)$$

is the elliptic polynomial point with the embedded secret key bit strings without any additional information. Additionally, any non-quadratic value in F(p) can be used for g. For efficiency, g is chosen to be −1 for p≡3 mod 4 and g is chosen to be 2 for p≡1 mod 4.

The same deterministic and non-iterative method described above can be used to embed a secret message bit string into an elliptic polynomial point in a deterministic and non-iterative manner. Assuming F=F(p) and that the message is an M-bit string such that (nx+ny+1)N>M>N−1, where N is the number of bits needed to represent the elements of F(p), then the message bit string is divided into (nx+ny+1) bit-strings $m_{x,0}, m_{x,1}, \ldots, m_{x,nx}, m_{y,1}, \ldots, m_{k,ny}$. The value of the bit-strings $m_{x,0}, m_{x,1}, \ldots, m_{x,nx}, m_{y,1}, \ldots, m_{k,ny}$ must be less than p. As in the previous embodiment, the embedding of the (nx+ny+1) bit-strings $m_{x,0}, m_{x,1}, \ldots, m_{x,nx}, m_{y,1}, \ldots, m_{k,ny}$ can be accomplished out as follows.

First, assign the value of the bit string of $m_{x,0}, m_{x,1}, \ldots, m_{x,nx}$ to $x_{0,m}, x_{1,m}, \ldots, x_{nx,m}$. Next, assign the value of the bit string of $m_{y,1}, \ldots, m_{k,ny}$ to $y_{1,m}, \ldots, y_{ny,m}$. Then compute:

$$T = -\sum_{i \in S_{ny}} a_{1i} y_{i,m}^2 - \sum_{i,l \in S_{ny}, l \neq i} a_{2il} y_{i,m} y_{l,m} + \sum_{l \in S_{nx}} b_{1l} x_{l,m}^3 + \sum_{l,i \in S_{nx}, l \neq i} b_{2li} x_{l,m}^2 x_{i,m}.$$

Finally, use the Legendre test to see if T has a square root. If T has a square root, then assign one of the roots to $y_0$, otherwise the x-coordinates and y-coordinates of the elliptic polynomial point with the embedded shared secret key bit string are given by $gx_{i,m}$ and $$g^{\frac{3}{2}} y_{i,m},$$

respectively.

It should be noted that p is usually predetermined prior to encryption; thus, the value of g can also be predetermined. Further, when using the above method, the strings $m_{x,0}$, $m_{x,1}$, ..., $m_{x,nx}$ and $m_{y,1}$, ..., $m_{k,ny}$ can be recovered directly from $x_{0,m}$, $x_{1,m}$, ..., $x_{nx,m}$ and $y_{1,m}$, ..., $y_{ny,m}$, respectively. An extra bit is needed to identify whether $(x_{0,m}, x_{1,m}, \ldots, x_{nx,m}, y_{0,m}, y_{1,m}, \ldots, y_{ny,m})$ or $$\left(gx_{0,m}, gx_{1,m}, \ldots, gx_{nx,m}, g^{\frac{3}{2}} y_{0,m}, g^{\frac{3}{2}} y_{1,m}, \ldots, g^{\frac{3}{2}} y_{ny,m}\right)$$

is used at the sending correspondent. Additionally, any non-quadratic value in $F(p)$ can be used for g. For efficiency, g is chosen to be $-1$ for $p \equiv 3 \mod 4$ and is chosen to be 2 for $p \equiv 1 \mod 4$. Further, at the receiver, the process is reversed. In the case of $g=2$, a division by two is carried out. It should noted that dividing $x_{i,m}$ by is two is computed using one modulo addition, because:

(i) $x_{i,m}/2 = ((x_{i,m} - (x_{i,m}) \mod 2)/2) + (x_{i,m}) \mod 2 * (\frac{1}{2}) \mod p$;
(ii) $(x_{i,m}) \mod 2$ is the least significant bit of $x_{i,m}$; and
(iii) $(\frac{1}{2}) \mod p = (p+1)/2$.

The following describes the mapping of points that satisfy one elliptic polynomial to points that satisfy another elliptic polynomial. The two elliptic polynomials are not required to be isomorphic with respect to each other. This mapping is used for "hopping" between elliptic polynomials.

The type of elliptic polynomial used for such mapping of points has the following form. The elliptic polynomial is a polynomial with more than two independent variables such that one of the variables, termed the y-coordinate, has a maximum degree of two, and appears on its own in only one of the monomials. The other variables, termed the x-coordinates, have a maximum degree of three, and each must appear in at least one of the monomials with a degree of three. Finally, all monomials that contain x-coordinates must have a total degree of three.

Letting $S_{nx}$ represent the set of numbers from 0 to nx (i.e., $S_{nx} = \{0, \ldots, nx\}$), then given a finite field F and denoting $b_{1l}^{(s)}, b_{2lk}^{(s)} \in F$ as the coefficients of the s-th elliptic polynomial, the following equation defined over F is an example of such an elliptic polynomial:

$$y^2 = \sum_{l \in S_{nx}} b_{1l}^{(s)} x_l^3 + \sum_{l,k \in S_{nx}, l \neq k} b_{2lk}^{(s)} x_l^2 x_k. \quad (25)$$

The following equations are examples of equation (25):

$$y^2 = b_{10}^{(s)} x_0^3 + b_{11}^{(s)} x_1^3 + b_{201}^{(s)} x_0^2 x_1 \quad (26)$$

$$y_0^2 = b_{10}^{(s)} x_0^3 + b_{11}^{(s)} x_1^3 b_{201}^{(s)} x_0^2 x_1 + b_{210}^{(s)} x_1^2 x_0 \quad (27).$$

Given an elliptic polynomial, such as that given above in equation (25), with coefficients $b_{1l}, b_{2lk1} \in F$, then $(x_{0,o}^{(s)}, x_{0,o}^{(s)}, \ldots, x_{nx,o}^{(s)}, y_o^{(s)})$ is denoted as a point that satisfies the s-th elliptic polynomial. Given another elliptic polynomial that is denoted the r-th polynomial, with coefficients $b_{1l}^{(r)}, b_{2lk}^{(r)} \in F$, then $$y^2 = \sum_{l \in S_{nx}} b_{1l}^{(r)} x_l^3 + \sum_{l,k \in S_{nx}, l \neq k} b_{2lk}^{(r)} x_l^2 x_k,$$

where the r-th elliptic polynomial is not necessarily isomorphic to the s-th elliptic polynomial, i.e., where all or some of the coefficients $b_{1l}^{(r)}, b_{2lk}^{(r)} \in F$ are different and independent of the coefficients $b_{1l}^{(s)}, b_{2lk}^{(s)} \in F$.

Elliptic polynomial hopping refers to hopping the point $(x_{0,o}^{(s)}, x_{0,o}^{(s)}, \ldots, x_{nx,o}^{(s)}, y_o^{(s)})$ satisfies the one elliptic polynomial (for example, the s-th elliptic polynomial with coefficients $b_{1l}^{(s)}, b_{2lk}^{(s)} \in F$) into an equivalent point $(x_{0,o}^{(r)}, x_{0,o}^{(r)}, \ldots, x_{nx,o}^{(r)}, y_o^{(r)})$ that satisfies the r-th elliptic polynomial with coefficients $b_{1l}^{(r)}, b_{2lk}^{(r)} \in F$.

One method of achieving this is as follows. First, set the x-coordinates of the hopped point $x_{0,o}^{(r)}, x_{1,o}^{(r)}, \ldots, x_{nx,o}^{(r)}$ to the x-coordinates $x_{0,o}^{(s)}, x_{1,o}^{(s)}, \ldots, x_{nx,o}^{(s)}$ of the original point, $x_{i,o}^{(r)} = x_{i,o}^{(s)}$ for $i=0, \ldots, nx$. Nest, substitute the value of the x-coordinates $x_{0,o}^{(r)}, x_{1,o}^{(r)}, \ldots, x_{nx,o}^{(r)}$ into the new elliptic polynomial equation to obtain $$T^{(r)} = \sum_{l \in S_{nx}} b_{1l}^{(r)} (x_l^{(r)})^3 + \sum_{l,k \in S_{nx}, l \neq k} b_{2lk}^{(r)} (x_l^{(r)})^2 x_k^{(r)}$$

(any value of $x_{0,o}^{(r)}, x_{1,o}^{(r)}, \ldots, x_{nx,o}^{(r)}$ will lead to a value of $T^{(r)} \in F(p)$, where $T^{(r)}$ could be quadratic residue or non-quadratic residue). Finally, if $T^{(r)}$ is quadratic residue, set $y_o^{(r)} = \sqrt{T^{(r)}}$ and the hopped point is given by $(x_{0,o}^{(r)}, x_{1,o}^{(r)}, \ldots, x_{nx,o}^{(r)}, y_o^{(r)})$; otherwise, if $T^{(r)}$ is a non-quadratic residue, set $y_{0,o}^{(r)} = \sqrt{g^3 T^{(r)}}$ and the hopped point is given by $(gx_{0,o}^{(r)}, gx_{1,o}^{(r)}, \ldots, gx_{nx,o}^{(r)}, y_{0,o}^{(r)})$.

Thus, any point that satisfies an elliptic polynomial can be hopped to is an equivalent point on another elliptic polynomial, even if the two polynomials are not isomorphic to each other.

Further, a point is never mapped to another point that satisfies the twist of another elliptic polynomial. As can be seen in the final step above, a point that satisfies an elliptic polynomial is mapped (hopped) to another point that satisfies another elliptic polynomial. Any point that satisfies one elliptic polynomial can be uniquely mapped to another point that satisfies either the equation of an elliptic polynomial or the equation of its twist. In order to show this unique mapping, an additional "-tuple" must be used to indicate as to whether a point that satisfies an elliptic polynomial is mapped to point on another elliptic polynomial or the twist of this other elliptic polynomial.

Thus, for purposes of point mapping between one elliptic polynomial into another, a point is represented as $(x_{0,o}^{(s)}, x_{1,o}^{(s)}, \ldots, x_{nx,o}^{(s)}, y_o^{(s)}, \alpha_o^{(s)})$. The last variable, $\alpha_o^{(s)}$, indicates whether the point $(x_{0,o}^{(s-1)}, x_{1,o}^{(s-1)}, \ldots, x_{nx,o}^{(s-1)}, y_o^{(s-1)}, \alpha_o^{(s-1)})$ that satisfies the previous elliptic polynomial was mapped to an elliptic polynomial or its twist. If $\alpha_o^{(s)} = 1$, the point $(x_{0,o}^{(s-1)}, x_{1,o}^{(s-1)}, \ldots, x_{nx,o}^{(s-1)}, y_o^{(s-1)}, \alpha_o^{(s-1)})$ was originally mapped to a point on the elliptic polynomial, otherwise if $\alpha_o^{(s)} = g$, the point $(x_{0,o}^{(s-1)}, x_{1,o}^{(s-1)}, \ldots, x_{nx,o}^{(s-1)}, y_o^{(s-1)}, \alpha_o^{(s-1)})$ was mapped to a point on the twist of an elliptic polynomial. The addition of the variable $\alpha^{(s)}$ as an extra "-tuple" in the representation of points allows the above procedure to be reversed as follows.

First, if $\alpha_o^{(s)}=1$, the x-coordinates $x_{0,o}^{(s-1)}, x_{1,o}^{(s-1)}, \ldots, x_{nx,o}^{(s-1)}$ are given by $x_{i,o}^{(s-1)}=x_{i,o}^{(s)}$ for $i=0, \ldots, nx$; otherwise, if $\alpha_o^{(s)}=g$, the x-coordinates $x_{0,o}^{(s-1)}, x_{1,o}^{(s-1)}, \ldots, x_{nx,o}^{(s-1)}$ are given by $x_{i,o}^{(s-1)}=g^{-1}x_{i,o}^{(s)}$ for $i=0, \ldots, nx$. Next, substitute the value of the x-coordinates $x_{0,o}^{(s-1)}, x_{1,o}^{(s-1)}, \ldots, x_{nx,o}^{(s-1)}$ into the (s-1) elliptic polynomial equation to obtain $$T^{(s-1)} = \sum_{l \in S_{nx}} b_{1l}^{(s-1)}(x_l^{(s-1)})^3 + \sum_{l,k \in S_{nx}, l \neq k} b_{2lk}^{(s-1)}(x_l^{(s-1)})^2 x_k^{(s-1)}.$$

Finally, compute $y_o^{(s-1)} = \sqrt{T^{(s-1)}}$, since it is known that the original point $(x_{0,o}^{(s-1)}, x_{1,o}^{(s-1)}, \ldots, x_{nx,o}^{(s-1)}, y_o^{(s-1)}, \alpha_o^{(s-1)})$ must satisfy the equation of an elliptic polynomial. Thus, $T^{(s-1)}$ is always a quadratic residue.

It should be noted that in the above procedures, the value of $\alpha_o^{(s-1)}$ is not defined, since the value depends on the mapping of the point that satisfies the (s-2) elliptic polynomial into the (s-1) elliptic polynomial. This value of $\alpha_o^{(s-1)}$ must be provided as additional information.

The following is a first embodiment of the MAC generation method using elliptic polynomial hopping. The method includes the following steps:

defining a maximum block size that can be embedded into an elliptic polynomial N;

defining an integer u such that a message bit string length is uN;

a sending correspondent and a receiving correspondent agreeing upon:
1) a form of an elliptic polynomial equation by deciding on an underlying finite field F; a number of x-coordinates, and a set of monomials used;
2) a random number $k_0$, which is kept as a secret key for generating a message authentication code;
3) a random number generator;
4) a random number $kp_0$ that is a portion of a shared secret key used for communication;
5) a set of (nx+1) numbers such that $xb_i \in F$, wherein i and nx are integers, wherein $i=0, \ldots, nx$, the set being used to find an initial base point, and the set being made public;

the sending correspondent then performing the following steps:
6) generating at least a portion of a set of coefficients $b_{1l}^{(0)}, b_{2lk}^{(0)} \in F$ of a first elliptic polynomial to be used for a message authentication code of a first message block, from the shared secret key $kp_0$;
7) embedding the set of (nx+1) numbers $xb_i \in F$ into an elliptic polynomial point to obtain an initial base point $(x_{0,B}^{(0)}, x_{1,B}^{(0)}, \ldots, x_{nx,B}^{(0)}, y_B^{(0)}, \alpha_B)$ using a data embedding method, as described in detail below;
8) embedding the first block of the message bit string into an elliptic polynomial message point $(x_{0,m}^{(0)}, x_{1,m}^{(0)}, \ldots, x_{nx,m}^{(0)}, y_m^{(0)}, \alpha_m^{(0)})$ using the data embedding method;
9) computing a scalar multiplication of the first block shared key $k_0$ with the base point $(x_{0,B}^{(0)}, x_{1,B}^{(0)}, \ldots, x_{nx,B}^{(0)}, y_B^{(0)}, \alpha_B)$ as $(x_{0,kB}^{(0)}, x_{1,kB}^{(0)}, \ldots, x_{nx,kB}^{(0)}, y_{kB}^{(0)}, 1) = k(x_{0,B}^{(0)}, x_{1,B}^{(0)}, \ldots, x_{nx,B}^{(0)}, y_B^{(0)}, \alpha_B)$;
10) computing the message authentication point of the first data block $(x_{0,c}^{(0)}, x_{1,c}^{(0)}, \ldots, x_{nx,c}^{(0)}, y_c^{(0)}, \alpha_c^{(0)})$ as:

$$(x_{0,c}^{(0)}, x_{1,c}^{(0)}, \ldots, x_{nx,c}^{(0)}, y_c^{(0)}, \alpha_c^{(0)}) = (x_{0,m}^{(0)}, x_{1,m}^{(0)}, \ldots, x_{nx,m}^{(0)}, y_m^{(0)}, \alpha_m^{(0)}) + (x_{0,kB}^{(0)}, x_{1,kB}^{(0)}, \ldots, x_{nx,kB}^{(0)}, y_{kB}^{(0)}, 1), \text{ wherein}$$
$\alpha_c^{(0)} = \alpha_m^{(0)}$;

initializing an integer j as j=1 and repeating the following steps 11) to 15), and incrementing j at each step until all of the message data blocks are processed:
11) generating a random number $kp_j$ with the random number generator;
12) generating at least a portion of the coefficients $b_{1l}^{(j)}, b_{2lk}^{(j)} \in F$ of the j-th elliptic polynomial from the random number $kp_j$;
13) embedding the j-th block of the message bit string into a j-th elliptic polynomial message point $(x_{0,m}^{(j)}, x_{1,m}^{(j)}, \ldots, x_{nx,m}^{(j)}, y_m^{(j)}, \alpha_m^{(j)})$ using the data embedding method;
14) hopping the message authentication code point $(x_{0,c}^{(j-1)}, x_{1,c}^{(j-1)}, \ldots, x_{nx,c}^{(j-1)}, y_c^{(j-1)}, \alpha_c^{(j-1)})$ to an equivalent message authentication code point $(x'_{0,c}^{(j)}, x'_{1,c}^{(j)}, \ldots, x'_{nx,c}^{(j)}, y'_c^{(j)}, \alpha'_c^{(j)})$ that satisfies the j-th elliptic polynomial of step 12 using the data embedding method;
15) computing the message authentication code point of the j-th data block $(x_{0,c}^{(j)}, x_{1,c}^{(j)}, \ldots, x_{nx,c}^{(j)}, y_c^{(j)}, \alpha_c^{(j)})$ as:

$$(x_{0,c}^{(j)}, x_{1,c}^{(j)}, \ldots, x_{nx,c}^{(j)}, y_c^{(j)}, \alpha_c^{(j)}) = (x_{0,m}^{(j)}, x_{1,m}^{(j)}, \ldots, x_{nx,m}^{(j)}, y_m^{(j)}, \alpha_m^{(j)}) + (x'_{0,c}^{(j)}, x'_{1,c}^{(j)}, \ldots, x'_{nx,c}^{(j)}, y'_c^{(j)}, \alpha'_c^{(j)});$$

16) appropriate bits of the x-coordinates and a bit indicating the value of $\alpha_c^{(u)}$ of a cipher point $(x_{0,c}^{(u)}, x_{1,c}^{(u)}, \ldots, x_{nx,c}^{(u)}, y_c^{(u)}, \alpha_c^{(j)})$ are concatenated together to form the message authentication code bit string and are sent to the receiving correspondent;

the receiving correspondent performing the following steps:
17) generating at least a portion of the coefficients $b_{1l}^{(0)}, b_{2lk}^{(0)} \in F$ of the first elliptic polynomial to be used for the message authentication code of the first message block from the shared secret key $kp_0$;
18) embedding the set of (nx+1) numbers $xb_i \in F$ into an elliptic polynomial point to obtain an initial base point $(x_{0,B}^{(0)}, x_{1,B}^{(0)}, \ldots, x_{nx,B}^{(0)}, y_B^{(0)}, \alpha_B)$ using the data embedding method;
19) embedding the first block of the received message bit string into an elliptic polynomial message point $(x_{0,rm}^{(0)}, x_{1,rm}^{(0)}, \ldots, x_{nx,rm}^{(0)}, y_{rm}^{(0)}, \alpha_{rm}^{(0)})$ using the data embedding method;
20) computing the scalar multiplication of the first block shared key $k_0$ with the base point $(x_{0,B}^{(0)}, x_{1,B}^{(0)}, \ldots, x_{nx,B}^{(0)}, y_B^{(0)}, \alpha_B)$ as $(x_{0,kB}^{(0)}, x_{1,kB}^{(0)}, \ldots, x_{nx,kB}^{(0)}, y_{kB}^{(0)}, 1) = k(x_{0,B}^{(0)}, x_{1,B}^{(0)}, \ldots, x_{nx,B}^{(0)}, y_B^{(0)}, \alpha_B)$;
21) computing the message authentication code point of the first received data block $(x_{0,rc}^{(0)}, x_{1,rc}^{(0)}, \ldots, x_{nx,rc}^{(0)}, y_{rc}^{(0)}, \alpha_{rc}^{(0)})$ as:

$$(x_{0,rc}^{(0)}, x_{1,rc}^{(0)}, \ldots, x_{nx,rc}^{(0)}, y_{rc}^{(0)}, \alpha_{rc}^{(0)}) = (x_{0,rm}^{(0)}, x_{1,rm}^{(0)}, \ldots, x_{nx,rm}^{(0)}, y_{rm}^{(0)}, \alpha_{rm}^{(0)}) + (x_{0,kB}^{(0)}, x_{1,kB}^{(0)}, \ldots, x_{nx,kB}^{(0)}, y_{kB}^{(0)}, 1), \text{ wherein}$$
$\alpha_{rc}^{(0)} = \alpha_{rm}^{(0)}$;

initializing the integer j as j=1 and repeating the following steps 22) to 27), and incrementing j at each step until all of the message data blocks are processed:
22) generating a random number $kp_j$ with the random number generator based upon $kp_{j-1}$;
23) generating at least a portion of the coefficients $b_{1l}^{(j)}, b_{2lk}^{(j)} \in F$ of the j-th elliptic polynomial from the random number $kp_j$;

24) embedding the j-th block of the received message bit string into a j-th elliptic polynomial message point $(x_{0,rm}^{(j)}, x_{1,rm}^{(j)}, \ldots, x_{nx,rm}^{(j)}, y_{rm}^{(j)}, \alpha_{rm}^{(j)})$ using the data embedding method;

25) hopping the message authentication point $(x_{0,rc}^{(j-1)}, x_{1,rc}^{(j-1)}, \ldots, x_{nx,rc}^{(j-1)}, y_{rc}^{(j-1)}, \alpha_{rc}^{(j-1)})$ to an equivalent message authentication point $(x'_{0,rc}^{(j)}, x'_{1,rc}^{(j)}, \ldots, x'_{nx,rc}^{(j)}, y'_{rc}^{(j)}, \alpha'_{rc}^{(j)})$ that satisfies the j-th elliptic polynomial selected in step 12) using the data embedding method;

26) computing the message authentication code point of the j-th received data block $(x_{0,rc}^{(j)}, x_{1,rc}^{(j)}, \ldots, x_{nx,rc}^{(j)}, y_{rc}^{(j)}, \alpha_{rc}^{(j)})$ is computed as:

$$(x_{0,rc}^{(j)}, x_{1,rc}^{(j)}, \ldots, x_{nx,rc}^{(j)}, y_{rc}^{(j)}, \alpha_{rc}^{(j)}) = \\ (x_{0,rm}^{(j)}, x_{1,rm}^{(j)}, \ldots, x_{nx,rm}^{(j)}, y_{rm}^{(j)}, \alpha_{rm}^{(j)}) + \\ (x'_{0,rc}^{(j)}, x'_{1,rc}^{(j)}, \ldots, x'_{nx,rc}^{(j)}, y'_{rc}^{(j)}, \alpha'_{rc}^{(j)});$$

27) the appropriate bits of the x-coordinates, and a bit indicating the value of $\alpha_c^{(u)}$ of the message authentication point $(x_{0,rc}^{(u)}, x_{1,rc}^{(u)}, \ldots, x_{nx,rc}^{(u)}, y_{rc}^{(u)}, \alpha_{rc}^{(u)})$ are concatenated together to form the message authentication code bit string of the received message data; and 28) if the message authentication code bit string of the received message data is the same as the message authentication code bit string sent by the sending correspondent, then the message is authenticated.

In an alternative embodiment of the message authentication code generating method, the underlying finite field, the number of x-coordinates and the monomials used are selected from a predefined set of elliptic polynomial equation that are agreed upon between the corresponding entities.

The primary condition is that the MAC size must be the same as the block size. The MAC block size is determined by the maximum block size defined by the selected elliptic polynomial equations. If certain elliptic equations result in MAC block sizes that are smaller than the specified size of the MAC, then padding is used to maintain uniform block size. The alternative method includes the steps of:

defining a maximum block size that can be embedded into an elliptic polynomial N;

defining an integer u such that a message bit string length is uN;

a sending correspondent and a receiving correspondent agreeing upon:

1) a set of forms of an elliptic polynomial equation by deciding on an underlying finite field F, a number of x-coordinates, and a set of monomials used, the set of forms of the elliptic polynomial equation each being defined by a binary code, and selection of a method for generating these codes from a given random number;

2) a random number $k_0$, which is kept as a secret key for generating a message authentication code;

3) a random number generator;

4) a random number $kp_0$ that is a portion of a shared secret key used for communication;

5) a set of (nx+1) numbers such that $xb_i \in F$, wherein i and nx are integers, wherein $i=0, \ldots, nx$, the set being used to find an initial base point, and the set being made public;

the sending correspondent then performing the following steps:

6) selecting an elliptic polynomial form from the agreed upon set of elliptic polynomial forms by generating its binary code using the shared secret key of a first block $kp_0$, and the generation method agreed upon in step 1);

7) generating at least a portion of a set of coefficients $b_{1l}^{(0)}$, $b_{2lk}^{(0)} \in F$ of a first elliptic polynomial to be used for a message authentication code of a first message block, from the shared secret key $kp_0$;

8) embedding the set of (nx+1) numbers $xb_i \in F$ into an elliptic polynomial point to obtain an initial base point $(x_{0,B}^{(0)}, x_{1,B}^{(0)}, \ldots, x_{nx,B}^{(0)}, y_B^{(0)}, \alpha_B)$ using a data embedding method, as described in detail below;

9) embedding the first block of the message bit string into an elliptic polynomial message point $(x_{0,m}^{(0)}, x_{1,m}^{(0)}, \ldots, x_{nx,m}^{(0)}, y_m^{(0)}, \alpha_m^{(0)})$ using the data embedding method;

10) computing a scalar multiplication of the first block shared key $k_0$ with the base point $(x_{0,B}^{(0)}, x_{1,B}^{(0)}, \ldots, x_{nx,B}^{(0)}, y_B^{(0)}, \alpha_B)$ as $(x_{0,kB}^{(0)}, x_{1,kB}^{(0)}, \ldots, x_{nx,kB}^{(0)}, y_{kB}^{(0)}, 1) = k(x_{0,B}^{(0)}, x_{1,B}^{(0)}, \ldots, x_{nx,B}^{(0)}, y_B^{(0)}, \alpha_B)$;

11) computing the message authentication point of the first data block $(x_{0,c}^{(0)}, x_{1,c}^{(0)}, \ldots, x_{nx,c}^{(0)}, y_c^{(0)}, \alpha_c^{(0)})$ as:

$$(x_{0,c}^{(0)}, x_{1,c}^{(0)}, \ldots, x_{nx,c}^{(0)}, y_c^{(0)}, \alpha_c^{(0)}) = \\ (x_{0,m}^{(0)}, x_{1,m}^{(0)}, \ldots, x_{nx,m}^{(0)}, y_m^{(0)}, \alpha_m^{(0)}) + \\ (x_{0,kB}^{(0)}, x_{1,kB}^{(0)}, \ldots, x_{nx,kB}^{(0)}, y_{kB}^{(0)}, 1), \text{ wherein}$$
$\alpha_c^{(0)} = \alpha_m^{(0)}$;

initializing an integer j as j=1 and repeating the following steps 12) to 17), and incrementing j at each step until all of the message data blocks are processed:

12) generating a random number $kp_j$ with the random number generator;

13) selecting an elliptic polynomial form from the agreed upon set of elliptic polynomial forms by generating its binary code using the shared secret key of a j-th block $kp_j$, and the agreed-upon generation method;

14) generating at least a portion of the coefficients $b_{1l}^{(j)}$, $b_{2lk}^{(j)} \in F$ of the j-th elliptic polynomial from the random number $kp_j$;

15) embedding the j-th block of the message bit string into a j-th elliptic polynomial message point $(x_{0,m}^{(j)}, x_{1,m}^{(j)}, \ldots, x_{nx,m}^{(j)}, y_m^{(j)}, \alpha_m^{(j)})$ using the data embedding method;

16) hopping the message authentication code point $(x_{0,c}^{(j-1)}, x_{1,c}^{(j-1)}, \ldots, x_{nx,c}^{(j-1)}, y_c^{(j-1)}, \alpha_c^{(j-1)})$ to an equivalent message authentication code point $(x'_{0,c}^{(j)}, x'_{1,c}^{(j)}, \ldots, x'_{nx,c}^{(j)}, y'_c^{(j)}, \alpha'_c^{(j)})$ that satisfies the j-th elliptic polynomial of step 12 using the data embedding method;

17) computing the message authentication code point of the j-th data block $(x_{0,c}^{(j)}, x_{1,c}^{(j)}, \ldots, x_{nx,c}^{(j)}, y_c^{(j)}, \alpha_c^{(j)})$ as:

$$(x_{0,c}^{(j)}, x_{1,c}^{(j)}, \ldots, x_{nx,c}^{(j)}, y_c^{(j)}, \alpha_c^{(j)}) = \\ (x_{0,m}^{(j)}, x_{1,m}^{(j)}, \ldots, x_{nx,m}^{(j)}, y_m^{(j)}, \alpha_m^{(j)}) + \\ (x'_{0,c}^{(j)}, x'_{1,c}^{(j)}, \ldots, x'_{nx,c}^{(j)}, y'_c^{(j)}, \alpha'_c^{(j)});$$

18) appropriate bits of the x-coordinates and a bit indicating the value of $\alpha_c^{(u)}$ of a cipher point $(x_{0,c}^{(u)}, x_{1,c}^{(u)}, \ldots, x_{nx,c}^{(u)}, y_c^{(u)}, \alpha_c^{(j)})$ are concatenated together to form the message authentication code bit string and are sent to the receiving correspondent;

the receiving correspondent performing the following steps:

19) selecting an elliptic polynomial form from the agreed upon set of elliptic polynomial forms by generating its binary code using the shared secret key of a first block $kp_0$, and the agreed-upon generation method;

20) generating at least a portion of the coefficients $b_{1l}^{(0)}$, $b_{2lk}^{(0)} \in F$ of the first elliptic polynomial to be used for the message authentication code of the first message block from the shared secret key $kp_0$;

21) embedding the set of (nx+1) numbers $xb_i \in F$ into an elliptic polynomial point to obtain an initial base point $(x_{0,B}^{(0)}, x_{1,B}^{(0)}, \ldots, x_{nx,B}^{(0)}, y_B^{(0)}, \alpha_B)$ using the data embedding method;

22) embedding the first block of the received message bit string into an elliptic polynomial message point $(x_{0,rm}^{(0)}, x_{1,rm}^{(0)}, \ldots, x_{nx,rm}^{(0)}, y_{rm}^{(0)}, \alpha_{rm}^{(0)})$ using the data embedding method;

23) computing the scalar multiplication of the first block shared key $k_0$ with the base point $(x_{0,B}^{(0)}, x_{1,B}^{(0)}, \ldots, x_{nx,B}^{(0)}, y_B^{(0)}, \alpha_B)$ as $(x_{0,kB}^{(0)}, x_{1,kB}^{(0)}, \ldots, x_{nx,kB}^{(0)}, y_{kB}^{(0)}, 1) = k(x_{0,B}^{(0)}, x_{1,B}^{(0)}, \ldots, x_{nx,B}^{(0)}, y_B^{(0)}, \alpha_B)$;

24) computing the message authentication code point of the first received data block $(x_{0,rc}^{(0)}, x_{1,rc}^{(0)}, \ldots, x_{nx,rc}^{(0)}, y_{rc}^{(0)}, \alpha_{rc}^{(0)})$ as:

$(x_{0,rc}^{(0)}, x_{1,rc}^{(0)}, \ldots, x_{nx,rc}^{(0)}, y_{rc}^{(0)}, \alpha_{rc}^{(0)}) =$
$(x_{0,rm}^{(0)}, x_{1,rm}^{(0)}, \ldots, x_{nx,rm}^{(0)}, y_{rm}^{(0)}, \alpha_{rm}^{(0)}) +$
$(x_{0,kB}^{(0)}, x_{1,kB}^{(0)}, \ldots, x_{nx,kB}^{(0)}, y_{kB}^{(0)}, 1)$, wherein
$\alpha_{rc}^{(0)} = \alpha_{rm}^{(0)}$;

initializing the integer j as j=1 and repeating the following steps 25) to 31), and incrementing j at each step until all of the message data blocks are processed:

25) generating a random number $kp_j$ with the random number generator based upon $kp_{j-1}$;

26) selecting an elliptic polynomial form from the agreed upon set of elliptic polynomial forms by generating its binary code using the shared secret key of the j-th block $kp_j$, and the agreed-upon generation method;

27) generating at least a portion of the coefficients $b_{1l}^{(j)}$, $b_{2lk}^{(j)} \in F$ of the j-th elliptic polynomial from the random number $kp_j$;

28) embedding the bath block of the received message bit string into a bath elliptic polynomial message point $(x_{0,rm}^{(j)}, x_{1,rm}^{(j)}, \ldots, x_{nx,rm}^{(j)}, y_{rm}^{(j)}, \alpha_{rm}^{(j)})$ using the data embedding method;

29) hopping the message authentication point $(x_{0,rc}^{(j-1)}, x_{1,rc}^{(j-1)}, \ldots, x_{nx,rc}^{(j-1)}, y_{rc}^{(j-1)}, \alpha_{rc}^{(j-1)})$ to an equivalent message authentication point $(x'_{0,rc}^{(j)}, x'_{1,rc}^{(j)}, \ldots, x'_{nx,rc}^{(j)}, y'_{rc}^{(j)}, \alpha'_{rc}^{(j)})$ that satisfies the j-th elliptic polynomial selected in step 12) using the data embedding method;

30) computing the message authentication code point of the j-th received data block $(x_{0,rc}^{(j)}, x_{1,rc}^{(j)}, \ldots, x_{nx,rc}^{(j)}, y_{rc}^{(j)}, \alpha_{rc}^{(j)})$ is computed as:

$(x_{0,rc}^{(j)}, x_{1,rc}^{(j)}, \ldots, x_{nx,rc}^{(j)}, y_{rc}^{(j)}, \alpha_{rc}^{(j)}) =$
$x_{0,rm}^{(j)}, x_{1,rm}^{(j)}, \ldots, x_{nx,rm}^{(j)}, y_{rm}^{(j)}, \alpha_{rm}^{(j)}) +$
$(x'_{0,rc}^{(j)}, x'_{1,rc}^{(j)}, \ldots, x'_{nx,rc}^{(j)}, y'_{rc}^{(j)}, \alpha'_{rc}^{(j)})$;

31) the appropriate bits of the x-coordinates, and a bit indicating the value of $\alpha_c^{(u)}$ of the message authentication point $(x_{0,rc}^{(u)}, x_{1,rc}^{(u)}, \ldots, x_{nx,rc}^{(u)}, y_{rc}^{(u)}, \alpha_{rc}^{(j)})$ are concatenated together to form the message authentication code bit string of the received message data; and 32) if the message authentication code bit string of the received message data is the same as the message authentication code bit string sent by the sending correspondent, then the message is authenticated.

As noted above, the methods include data embedding. In order to embed a message bit string into a point $(x, \sqrt{\alpha}y)$ which satisfies either an elliptic curve equation $y^2 = x^3 + ax + b$ or its twist, $\overline{\alpha}y^2 = x^3 + ax + b$, the message bit string is first divided into N-bit strings and the $i^{th}$ block is denoted as $m_i$. Following this, the value of the bit string of $m_i$ is assigned to $x_{m_i}$, and the values of $x_{m_i}$ are substituted and the value of $t_{m_i}$ is computed using $t_{m_i} = x_{m_i}^3 + ax_{m_i} + b$.

If $t_{m_i}$ is quadratic residue, then $y_{m_i} = \sqrt{t_{m_i}}$ and the point is given as $(x_{m_i}, y_{m_i})$. However, if $t_{m_i}$ is non-quadratic residue, then $$y_{m_i} = \sqrt{\frac{t_{m_i}}{\overline{\alpha}}}$$

and the point is given as $(x_{m_i}, \sqrt{\overline{\alpha}}y_{m_i})$. The message point is then denoted as $(x_{m_i}, \sqrt{\alpha_{m_i}}y_{m_i})$, where the point is on the elliptic curve if $\alpha_{m_i} = 1$, and the point is on the twist if $\alpha_{m_i} = \overline{\alpha}$.

The Legendre Symbol is used to test whether an element of F(p) has a square root or not, i.e., whether an element is quadratic residue or not. The Legendre Symbol and test are as follows. Given an element of a finite field F(p), such as d, the Legendre symbol is defined as $$\left(\frac{d}{p}\right).$$

In order to test whether d is quadratic residue or not, the Legendre symbol, $$\left(\frac{d}{p}\right),$$

is computed such that $$\left(\frac{d}{p}\right) = \begin{cases} +1 & \text{if } x \text{ is quadratic residue} \\ 0 & \text{if } x \equiv 0 \mod F(p) \\ -1 & \text{otherwise.} \end{cases}$$

In the above, the MACs use the scalar multiplication $k_m (x_{Pu}, y_{Pu})$. It should be noted that, in order to find a collision means, that there are two message bits strings m and m' such that their integer values $k_m$ and $k_{m'}$ will lead to $k_m k(x_B, y_B) = k_{m'} k(x_B, y_B)$. This collision implies that integers can be found such that $k_m k - k_{m'} k = l * \#EC$, where #EC is the order of the group (EC,+). This is equivalent to solving the elliptic curve discrete logarithm problem. This also applies to finding a collision for the points on the twist of an elliptic curve, $k_m k(x_{TB}, \sqrt{\overline{\alpha}}y_{TB}) = k_{m'} k(x_{TB}, \sqrt{\overline{\alpha}}y_{TB})$.

Thus, security of the message authentication codes depends on the security of the underlying elliptic curve cryptography. The security of elliptic curve cryptosystems is assessed by both the effect on the solution of the elliptic curve discrete logarithmic problem (ECDLP) and power analysis attacks.

It is well known that the elliptic curve discrete logarithm problem (ECDLP) is apparently intractable for non-singular elliptic curves. The ECDLP problem can be stated as follows: given an elliptic curve defined over F that needs N-bits for the representation of its elements, an elliptic curve point $(x_P, y_P) \in EC$, defined in affine coordinates, and a point $(x_Q, y_Q) \in EC$, defined in affine coordinates, determine the integer k, $0 \leq k \leq \#F$, such that $(x_Q, y_Q) = k(x_P, y_P)$, provided that such an integer exists. In the below, it is assumed that such an integer exists.

The most well known attack used against the ECDLP is the Pollard $\rho$-method, which has a complexity of $O(\sqrt{\pi K}/2)$, where K is the order of the underlying group, and the complexity is measured in terms of an elliptic curve point addition.

Since the underlying cryptographic problems used in the above block cipher chaining methods is the discrete logarithm problem, which is a known difficult mathematical problem, it is expected that the security of the above methods are more secure than prior art ciphers which are not based on such a mathematically difficult problem.

It will be understood that the message authentication codes generated with elliptic polynomial hopping described above may be implemented by software stored on a medium readable by a computer and executing as set of instructions on a processor (including a microprocessor, microcontroller, or the like) when loaded into main memory in order to carry out a cryptographic system of secure communications in a computer network. As used herein, a medium readable by a computer includes any form of magnetic, optical, mechanical, laser, or other media readable by a computer, including floppy disks, hard disks, compact disks (CDs), digital versatile disk (DVD), laser disk, magnetic tape, paper tape, punch cards, flash memory, etc.

It is to be understood that the present invention is not limited to the embodiments described above, but encompasses any and all embodiments within the scope of the following claims.

We claim:

1. A computerized method of generating a message authentication code with elliptic polynomial hopping, comprising the steps of:
a sending correspondent and a receiving correspondent agreeing upon:
(a) a form of an elliptic polynomial equation by deciding on an underlying finite field F; a number of x-coordinates, and a set of monomials used;
(b) a random number $k_0$, which is kept as a secret key for generating a message authentication code, and a method for generating the message authentication code given a random number;
(c) a random number generator;
d) a random number $kp_0$ that is a portion of a shared secret key used for communication;
(e) a set of (nx+1) numbers such that $xb_i \in F$, wherein i and nx are integers, wherein i=0, ..., nx, the set being used to find an initial base point, the set being made public;
the sending correspondent then performing the following steps:
(f) generating at least a portion of a set of coefficients $b_{1l}^{(0)}$, $b_{2lk}^{(0)} \in F$ of a first elliptic polynomial to be used for a message authentication code of a first message block, from the shared secret key $kp_0$;
(g) embedding the set of (nx+1) numbers $xb_i \in F$ into an elliptic polynomial point to obtain an initial base point $(x_{0,B}^{(0)}, x_{1,B}^{(0)}, \ldots, x_{nx,B}^{(0)}, y_B^{(0)}, \alpha_B)$ using a data embedding method;
(h) embedding the first block of the message bit string into an elliptic polynomial message point $(x_{0,m}^{(0)}, x_{1,m}^{(0)}, \ldots, x_{nx,m}^{(0)}, y_m^{(0)}, \alpha_m^{(0)})$ using the data embedding method;
(i) computing a scalar multiplication of the first block shared key $k_0$ with the base point $(x_{0,B}^{(0)}, x_{1,B}^{(0)}, \ldots, x_{nx,B}^{(0)}, y_B^{(0)}, \alpha_B)$ as $(x_{0,kB}^{(0)}, x_{1,kB}^{(0)}, \ldots, x_{nx,kB}^{(0)}, y_{kB}^{(0)}, 1) = k(x_{0,B}^{(0)}, x_{1,B}^{(0)}, \ldots, x_{nx,B}^{(0)}, y_B^{(0)}, \alpha_B)$;
(j) computing the message authentication point of the first data block $(x_{0,c}^{(0)}, x_{1,c}^{(0)}, \ldots, x_{nx,c}^{(0)}, y_c^{(0)}, \alpha_c^{(0)})$ as:

$$(x_{0,c}^{(0)}, x_{1,c}^{(0)}, \ldots, x_{nx,c}^{(0)}, y_c^{(0)}, \alpha_c^{(0)}) = (x_{0,m}^{(0)}, x_{1,m}^{(0)}, \ldots, x_{nx,m}^{(0)}, y_m^{(0)}, \alpha_m^{(0)}) + (x_{0,kB}^{(0)}, x_{1,kB}^{(0)}, \ldots, x_{nx,kB}^{(0)}, y_{kB}^{(0)}, 1), \text{ wherein } \alpha_c^{(0)} = \alpha_m^{(0)};$$

initializing an integer j as j=1 and repeating the following steps (k) to (o), and incrementing j at each step until all of the message data blocks are processed:
(k) generating a random number $kp_j$ with the random number generator;
(l) generating at least a portion of the coefficients $b_{1l}^{(j)}$, $b_{2lk}^{(j)} \in F$ of the j-th elliptic polynomial from the random number $kp_j$;
(m) embedding the j-th block of the message bit string into a j-th elliptic polynomial message point $(x_{0,m}^{(j)}, x_{1,m}^{(j)}, \ldots, x_{nx,m}^{(j)}, y_m^{(j)}, \alpha_m^{(j)})$ using the data embedding method;
(n) hopping the message authentication code point $(x_{0,c}^{(j-1)}, x_{1,c}^{(j-1)}, \ldots, x_{nx,c}^{(j-1)}, y_c^{(j-1)}, \alpha_c^{(j-1)})$ to an equivalent message authentication code point $(x'_{0,c}^{(j)}, x'_{1,c}^{(j)}, \ldots, x'_{nx,c}^{(j)}, y'_c^{(j)}, \alpha'_c^{(j)})$ that satisfies the j-th elliptic polynomial of step (l) using the data embedding method;
(o) computing the message authentication code point of the j-th data block $(x_{0,c}^{(j)}, x_{1,c}^{(j)}, \ldots, x_{nx,c}^{(j)}, y_c^{(j)}, \alpha_c^{(j)})$ as:

$$(x_{0,c}^{(j)}, x_{1,c}^{(j)}, \ldots, x_{nx,c}^{(j)}, y_c^{(j)}, \alpha_c^{(j)}) = (x_{0,m}^{(j)}, x_{1,m}^{(j)}, \ldots, x_{nx,m}^{(j)}, y_m^{(j)}, \alpha_m^{(j)}) + (x'_{0,c}^{(j)}, x'_{1,c}^{(j)}, \ldots, x'_{nx,c}^{(j)}, y'_c^{(j)}, \alpha'_c^{(j)});$$

(p) appropriate bits of the x-coordinates and a bit indicating the value of $\alpha_c^{(u)}$ of a cipher point $(x_{0,c}^{(u)}, x_{1,c}^{(u)}, \ldots, x_{nx,c}^{(u)}, y_c^{(u)}, \alpha_c^{(u)})$ are concatenated together to form the message authentication code bit string and are sent to the receiving correspondent;
the receiving correspondent performing the following steps:
(q) generating at least a portion of the coefficients $b_{1l}^{(0)}$, $b_{2lk}^{(0)} \in F$ of the first elliptic polynomial to be used for the message authentication code of the first message block from the shared secret key $kp_0$;
(r) embedding the set of (nx+1) numbers $xb_i \in F$ into an elliptic polynomial point to obtain an initial base point $(x_{0,B}^{(0)}, x_{1,B}^{(0)}, \ldots, x_{nx,B}^{(0)}, y_B^{(0)}, \alpha_B)$ using the data embedding method;
(s) embedding the first block of the received message bit string into an elliptic polynomial message point $(x_{0,rm}^{(0)}, x_{1,rm}^{(0)}, \ldots, x_{nx,rm}^{(0)}, y_{rm}^{(0)}, \alpha_m^{(0)})$ using the data embedding method;
(t) computing the scalar multiplication of the first block shared key $k_0$ with the base point $(x_{0,B}^{(0)}, x_{1,B}^{(0)}, \ldots, x_{nx,B}^{(0)}, y_B^{(0)}, \alpha_B)$ as $(x_{0,kB}^{(0)}, x_{1,kB}^{(0)}, \ldots, x_{nx,kB}^{(0)}, y_{kB}^{(0)}, 1) = k(x_{0,B}^{(0)}, x_{1,B}^{(0)}, \ldots, x_{nx,B}^{(0)}, y_B^{(0)}, \alpha_B)$;
(u) computing the message authentication code point of the first received data block $(x_{0,rc}^{(0)}, x_{1,rc}^{(0)}, \ldots, x_{nx,rc}^{(0)}, y_{rc}^{(0)}, \alpha_{rc}^{(0)})$ as:

$$(x_{0,rc}^{(0)}, x_{1,rc}^{(0)}, \ldots, x_{nx,rc}^{(0)}, y_{rc}^{(0)}, \alpha_{rc}^{(0)}) = (x_{0,rm}^{(0)}, x_{1,rm}^{(0)}, \ldots, x_{nx,rm}^{(0)}, y_{rm}^{(0)}, \alpha_{rm}^{(0)}) + (x_{0,kB}^{(0)}, x_{1,kB}^{(0)}, \ldots, x_{nx,kB}^{(0)}, y_{kB}^{(0)}, 1), \text{ wherein } \alpha_{rc}^{(0)} = \alpha_{rm}^{(0)};$$

initializing the integer j as j=1 and repeating the following steps (v) to (aa), and incrementing j at each step until all of the message data blocks are processed:
(v) generating a random number $kp_j$ with the random number generator based upon $kp_{j-1}$;
(w) generating at least a portion of the coefficients $b_{1l}^{(j)}$, $b_{2lk}^{(j)} \in F$ of the j-th elliptic polynomial from the random number $kp_j$;

(x) embedding the j-th block of the received message bit string into a j-th elliptic polynomial message point $(x_{0,rm}^{(j)}, x_{1,rm}^{(j)}, \ldots, x_{nx,rm}^{(j)}, y_{rm}^{(j)}, \alpha_{rm}^{(j)})$ using the data embedding method;

(y) hopping the message authentication point $(x_{0,rc}^{(j-1)}, x_{1,rc}^{(j-1)}, \ldots, x_{nxr,c}^{(j-1)}, y_{rc}^{(j-1)}, \alpha_{rc}^{(j-1)})$ to an equivalent message authentication point $(x'_{0,rc}^{(j)}, x'_{1,rc}^{(j)}, \ldots, x'_{nx,rc}^{(j)}, y'_{rc}^{(j)}, \alpha'_{rc}^{(j)})$ that satisfies the j-th elliptic polynomial selected in step (l) using the data embedding method;

(z) computing the message authentication code point of the j-th received data block $(x_{0,rc}^{(j)}, x_{1,rc}^{(j)}, \ldots, x_{nx,rc}^{(j)}, y_{rc}^{(j)}, \alpha_{rc}^{(j)})$ is computed as:

$(x_{0,rc}^{(j)}, x_{1,rc}^{(j)}, \ldots, x_{nx,rc}^{(j)}, y_{rc}^{(j)}, \alpha_{rc}^{(j)}) = (x_{0,rm}^{(j)}, x_{1,rm}^{(j)}, \ldots, x_{nx,rm}^{(j)}, y_{rm}^{(j)}, \alpha_{rm}^{(j)}) + (x'_{0,rc}^{(j)}, x'_{1,rc}^{(j)}, \ldots, x'_{nx,rc}^{(j)}, y'_{rc}^{(j)}, \alpha'_{rc}^{(j)})$;

(aa) the appropriate bits of the x-coordinates, and a bit indicating the value of $\alpha_c^{(u)}$ of the message authentication point $(x_{0,rc}^{(u)}, x_{1,rc}^{(u)}, \ldots, x_{nx,rc}^{(u)}, y_{rc}^{(u)}, \alpha_{rc}^{(j)})$ are concatenated together to form the message authentication code bit string of the received message data; and (bb) if the message authentication code bit string of the received message data is the same as the message authentication code bit string sent by the sending correspondent, then the message is authenticated.

2. The computerized method of generating the message authentication code as recited in claim 1, wherein the form of the elliptic polynomial equation is selected to be $$y^2 = \sum_{l \in S_{nx}} b_{1l}^{(s)} x_l^3 + \sum_{l,k \in S_{nx}, l \neq k} b_{2lk}^{(s)} x_l^2 x_k.$$

3. The computerized method of generating the message authentication code as recited in claim 2, wherein the data embedding method includes the steps of:

(a) dividing the message bit string into (nx+ny+1) bit-strings $m_{x,0}, m_{x,1}, \ldots, m_{x,nx}, m_{y,1}, \ldots, m_{k,ny}$;

(b) assigning the value of the bit string of $m_{x,0}, m_{x,1}, \ldots, m_{x,nx}$ to $x_{0,m}, x_{1,m}, \ldots, x_{nx,m}$;

(c) assigning the value of the bit string of $m_{y,1}, \ldots, m_{k,ny}$ to $y_{1,m}, \ldots, y_{ny,m}$;

(d) computing $$T^{(s-1)} = \sum_{l \in S_{nx}} b_{1l} x_l^3 + \sum_{l,k \in S_{nx}, l \neq k} b_{2lk} x_l^2 x_k;$$

and (e) performing a Legendre test to determine if T has a square root, wherein if T has a square root, then assigning the square root to $y_0$, and if T does not have a square root, then the x-coordinates and y-coordinates of the elliptic polynomial point with the embedded shared secret key bit string are selected as $gx_{i,m}$ and $$g^{\frac{3}{2}} y_{i,m},$$

respectively, where g is non-quadratic residue in F.

4. The computerized method of generating the message authentication code as recited in claim 3, wherein the step of generating the message authentication code includes the further step of:

a) setting the x-coordinates of a hopped point $x_{0,o}^{(r)}, x_{1,o}^{(r)}, \ldots, x_{nx,o}^{(r)}$ to the x-coordinates $(x_{0,o}^{(s)}, x_{1,o}^{(s)}, \ldots, x_{nx,o}^{(s)})$ of an original point $x_{i,o}^{(r)} = x_{i,o}^{(s)}$ for $i=0, \ldots, nx$;

b) substituting the value of the x-coordinates $(x_{0,o}^{(r)}, x_{1,o}^{(r)}, \ldots, x_{nx,o}^{(r)})$ into a new elliptic polynomial equation to obtain $$T^{(r)} = \sum_{l \in S_{nx}} b_{1l}^{(r)} (x_l^{(r)})^3 + \sum_{l,k \in S_{nx}, l \neq k} b_{2lk}^{(r)} (x_l^{(r)})^2 x_k^{(r)},$$

wherein any value of $x_{0,o}^{(r)}, x_{1,o}^{(r)}, \ldots, x_{nx,o}^{(r)}$ leads to a value of; and c) if $T^{(r)}$ is quadratic reside, then setting $y_o^{(r)} = \sqrt{T^{(r)}}$ and the hopped point is given by $(x_{0,o}^{(r)}, x_{1,o}^{(r)}, \ldots, x_{nx,o}^{(r)}, y_o^{(r)})$, and if T is non-quadratic residue, then setting $y_0^{(r)} = \sqrt{g^3 T^{(r)}}$, and the hopped point is given by $(gx_{0,o}^{(r)}, gx_{1,o}^{(r)}, \ldots, gx_{nx,o}^{(r)}, y_o^{(r)})$.

5. A computerized method of generating a message authentication code with elliptic polynomial hopping, comprising the steps of:

a sending correspondent and a receiving correspondent agreeing upon:

(a) a form of an elliptic polynomial equation by deciding on an underlying finite field F; a number of x-coordinates, and a set of monomials used;

(b) a random number $k_0$, which is kept as a secret key for generating a message authentication code;

(c) a random number generator;

d) a random number $kp_0$ that is a portion of a shared secret key used for communication, and a method of generating the message authentication codes from a given random number;

(e) a set of (nx+1) numbers such that $xb_i \in F$, wherein i and nx are integers, wherein $i=0, \ldots, nx$, the set being used to find an initial base point, the set being made public;

the sending correspondent then performing the following steps:

(f) selecting an elliptic polynomial form from the agreed upon set of elliptic polynomial forms by generating its binary code using the shared secret key of a first block $kp_0$, and the agreed-upon generation method;

(g) generating at least a portion of a set of coefficients $b_{1l}^{(0)}, b_{2lk}^{(0)} \in F$ of a first elliptic polynomial to be used for a message authentication code of a first message block, from the shared secret key $kp_0$;

(h) embedding the set of (nx+1) numbers $xb_i \in F$ into an elliptic polynomial point to obtain an initial base point $(x_{0,B}^{(0)}, x_{1,B}^{(0)}, \ldots, x_{nx,B}^{(0)}, y_B^{(0)}, \alpha_B)$ using a data embedding method;

(i) embedding the first block of the message bit string into an elliptic polynomial message point $(x_{0,m}^{(0)}, x_{1,m}^{(0)}, \ldots, x_{nx,m}^{(0)}, y_m^{(0)}, \alpha_m^{(0)})$ using the data embedding method;

(j) computing a scalar multiplication of the first block shared key $k_0$ with the base point $(x_{0,B}^{(0)}, x_{1,B}^{(0)}, \ldots, x_{nx,B}^{(0)}, y_B^{(0)}, \alpha_B)$ as $(x_{0,kB}^{(0)}, x_{1,kB}^{(0)}, \ldots, x_{nx,B}^{(0)}, y_{kB}^{(0)}, 1) = k(x_{0,B}^{(0)}, x_{1,B}^{(0)}, \ldots, x_{nx,B}^{(0)}, y_B^{(0)}, \alpha_B)$;

(k) computing the message authentication point of the first data block $(x_{0,c}^{(0)}, x_{1,c}^{(0)}, \ldots, x_{nx,c}^{(0)}, y_c^{(0)}, \alpha_c^{(0)})$ as:

$$(x_{0,c}^{(0)}, x_{1,c}^{(0)}, \ldots, x_{nx,c}^{(0)}, y_c^{(0)}, \alpha_c^{(0)}) = \\ (x_{0,m}^{(0)}, x_{1,m}^{(0)}, \ldots, x_{nx,m}^{(0)}, y_m^{(0)}, \alpha_m^{(0)}) + \\ (x_{0,kB}^{(0)}, x_{1,kB}^{(0)}, \ldots, x_{nx,kB}^{(0)}, y_{kB}^{(0)}, 1), \text{ wherein} \\ \alpha_c^{(0)} = \alpha_m^{(0)};$$

initializing an integer j as j=1 and repeating the following steps (l) to (r), and incrementing j at each step until all of the message data blocks are processed:

(l) generating a random number $kp_j$ with the random number generator;

(m) selecting an elliptic polynomial form from the agreed upon set of elliptic polynomial forms by generating its binary code using the shared secret key of a j-th block $kp_j$, and the agreed-upon generation method;

(n) generating at least a portion of the coefficients $b_{1l}^{(j)}$, $b_{2lk}^{(j)} \in F$ of the j-th elliptic polynomial from the random number $kp_j$;

(o) embedding the j-th block of the message bit string into a j-th elliptic polynomial message point $(x_{0,m}^{(j)}, x_{1,m}^{(j)}, \ldots, x_{nx,m}^{(j)}, y_m^{(j)}, \alpha_m^{(j)})$ using the data embedding method;

(p) hopping the message authentication code point $(x_{0,c}^{(j-1)}, x_{1,c}^{(j-1)}, \ldots, x_{nx,c}^{(j-1)}, y_c^{(j-1)}, \alpha_c^{(j-1)})$ to an equivalent message authentication code point $(x'_{0,c}^{(j)}, x'_{1,c}^{(j)}, \ldots, x'_{nx,c}^{(j)}, y'_c^{(j)}, \alpha'_c^{(j)})$ that satisfies the j-th elliptic polynomial of step (l) using the data embedding method;

(q) computing the message authentication code point of the j-th data block $(x_{0,c}^{(j)}, x_{1,c}^{(j)}, \ldots, x_{nx,c}^{(j)}, y_c^{(j)}, \alpha_c^{(j)})$ as:

$$(x_{0,c}^{(j)}, x_{1,c}^{(j)}, \ldots, x_{nx,c}^{(j)}, y_c^{(j)}, \alpha_c^{(j)}) = \\ (x_{0,m}^{(j)}, x_{1,m}^{(j)}, \ldots, x_{nx,m}^{(j)}, y_m^{(j)}, \alpha_m^{(j)}) + \\ (x'_{0,c}^{(j)}, x'_{1,c}^{(j)}, \ldots, x'_{nx,c}^{(j)}, y'_c^{(j)}, \alpha'_c^{(j)});$$

(r) appropriate bits of the x-coordinates and a bit indicating the value of $\alpha_c^{(u)}$ of a cipher point $(x_{0,c}^{(u)}, x_{1,c}^{(u)}, \ldots, x_{nx,c}^{(u)}, y_c^{(u)}, \alpha_c^{(j)})$ are concatenated together to form the message authentication code bit string and are sent to the receiving correspondent;

the receiving correspondent performing the following steps:

(s) selecting an elliptic polynomial form from the agreed upon set of elliptic polynomial forms by generating its binary code using the shared secret key of a-first block $kp_0$, and the agreed-upon generation method;

(t) generating at least a portion of the coefficients $b_{1l}^{(0)}$, $b_{2lk}^{(0)} \in F$ of the first elliptic polynomial to be used for the message authentication code of the first message block from the shared secret key $kp_0$;

(u) embedding the set of (nx+1) numbers $xb_i \in F$ into an elliptic polynomial point to obtain an initial base point $(x_{0,B}^{(0)}, x_{1,B}^{(0)}, \ldots, x_{nx,B}^{(0)}, y_B^{(0)}, \alpha_B)$ using the data embedding method;

(v) embedding the first block of the received message bit string into an elliptic polynomial message point $(x_{0,rm}^{(0)}, x_{1,rm}^{(0)}, \ldots, x_{nx,rm}^{(0)}, y_{rm}^{(0)}, \alpha_{rm}^{(0)})$ using the data embedding method;

(w) computing the scalar multiplication of the first block shared key $k_0$ with the base point $(x_{0,B}^{(0)}, x_{1,B}^{(0)}, \ldots, x_{nx,B}^{(0)}, y_B^{(0)}, \alpha_B)$ as $(x_{0,kB}^{(0)}, x_{1,kB}^{(0)}, \ldots, x_{nx,kB}^{(0)}, y_B^{(0)}, 1) = k(x_{0,B}^{(0)}, x_{1,B}^{(0)}, \ldots, x_{nx,B}^{(0)}, y_B^{(0)}, \alpha_B)$;

(x) computing the message authentication code point of the first received data block $(x_{0,rc}^{(0)}, x_{1,rc}^{(0)}, \ldots, x_{nx,rc}^{(0)}, y_{rc}^{(0)}, \alpha_{rc}^{(0)})$ as:

$$(x_{0,rc}^{(0)}, x_{1,rc}^{(0)}, \ldots, x_{nx,rc}^{(0)}, y_{rc}^{(0)}, \alpha_{rc}^{(0)}) = \\ (x_{0,rm}^{(0)}, x_{1,rm}^{(0)}, \ldots, x_{nx,rm}^{(0)}, y_{rm}^{(0)}, \alpha_{rm}^{(0)}) + \\ (x_{0,kB}^{(0)}, x_{1,kB}^{(0)}, \ldots, x_{nx,kB}^{(0)}, y_{kB}^{(0)}, 1), \text{ wherein} \\ \alpha_{rc}^{(0)} = \alpha_{rm}^{(0)};$$

initializing the integer j as j=1 and repeating the following steps (y) to (ee), and incrementing j at each step until all of the message data blocks are processed:

(y) generating a random number $kp_j$ with the random number generator based upon $kp_{j-1}$;

(z) selecting an elliptic polynomial form from the agreed upon set of elliptic polynomial forms by generating its binary code using the shared secret key of the j-th block $kp_j$, and the agreed-upon generation method;

(aa) generating at least a portion of the coefficients $b_{1l}^{(j)}$, $b_{2lk}^{(j)} \in F$ of the j-th elliptic polynomial from the random number $kp_j$;

(bb) embedding the j-th block of the received message bit string into a j-th elliptic polynomial message point $(x_{0,rm}^{(j)}, x_{1,rm}^{(j)}, \ldots, x_{nx,rm}^{(j)}, y_{rm}^{(j)}, \alpha_{rm}^{(j)})$ using the data embedding method;

(cc) hopping the message authentication point $(x_{0,rc}^{(j-1)}, x_{1,rc}^{(j-1)}, \ldots, x_{nx,rc}^{(j-1)}, y_{rc}^{(j-1)}, \alpha_{rc}^{(j-1)})$ to an equivalent message authentication point $(x'_{0,rc}^{(j)}, x'_{1,rc}^{(j)}, \ldots, x'_{nx,rc}^{(j)}, y'_{rc}^{(j)}, \alpha'_{rc}^{(j)})$ that satisfies the j-th elliptic polynomial selected in step (l) using the data embedding method;

(dd) computing the message authentication code point of the j-th received data block $(x_{0,rc}^{(j)}, x_{1,rc}^{(j)}, \ldots, x_{nx,rc}^{(j)}, y_{rc}^{(j)}, \alpha_{rc}^{(j)})$ is computed as:

$$(x_{0,rc}^{(j)}, x_{1,rc}^{(j)}, \ldots, x_{nx,rc}^{(j)}, y_{rc}^{(j)}, \alpha_{rc}^{(j)}) = \\ (x_{0,rm}^{(j)}, x_{1,rm}^{(j)}, \ldots, x_{nx,rm}^{(j)}, y_{rm}^{(j)}, \alpha_{rm}^{(j)}) + \\ (x'_{0,rc}^{(j)}, x'_{1,rc}^{(j)}, \ldots, x'_{nx,rc}^{(j)}, y'_{rc}^{(j)}, \alpha'_{rc}^{(j)});$$

(ee) the appropriate bits of the x-coordinates, and a bit indicating the value of $\alpha_c^{(u)}$ of the message authentication point $(x_{0,rc}^{(u)}, x_{1,rc}^{(u)}, \ldots, x_{nx,rc}^{(u)}, y_{rc}^{(u)}, \alpha_{rc}^{(j)})$ are concatenated together to form the message authentication code bit string of the received message data; and (ff) if the message authentication code bit string of the received message data is the same as the message authentication code bit string sent by the sending correspondent, then the message is authenticated.

6. The computerized method of generating the message authentication code as recited in claim 5, wherein the form of the elliptic polynomial equation is selected to be $$y^2 = \sum_{l \in S_{nx}} b_{1l}^{(s)} x_l^3 + \sum_{l,k \in S_{nx}, l \neq k} b_{2lk}^{(s)} x_l^2 x_k.$$

7. The computerized method of generating the message authentication code as recited in claim 6, wherein the data embedding method includes the steps of:

a) dividing the message bit string into (nx+ny+1) bit-strings $m_{x,0}, m_{x,1}, \ldots, m_{x,nx}, m_{y,1}, \ldots, m_{k,ny}$;

b) assigning the value of the bit string of $m_{x,0}, m_{x,1}, \ldots, m_{x,nx}$ to $x_{0,m}, x_{1,m}, \ldots, x_{nx,m}$;

c) assigning the value of the bit string of $m_{y,1}, \ldots, m_{k,ny}$ to $y_{1,m}, \ldots, y_{ny,m}$;

d) computing $$T^{(s-1)} = \sum_{l \in S_{nx}} b_{1l} x_l^3 + \sum_{l,k \in S_{nx}, l \neq k} b_{2lk} x_l^2 x_k;$$

and e) performing a Legendre test to determine if T has a square root, wherein if T has a square root, then assigning the square root to $y_0$, and if T does not have a square root, then the x-coordinates and y-coordinates of the elliptic polynomial point with the embedded shared secret key bit string are selected as $gx_{i,m}$ and $g^{3/2} y_{i,m}$, respectively.

8. The computerized method of generating the message authentication code as recited in claim 7, wherein the step of generating the message authentication code includes the further step of:

a) setting the x-coordinates of a hopped point $(x_{0,o}^{(r)}, x_{1,o}^{(r)}, \ldots, x_{nx,o}^{(r)})$ to the x-coordinates $(x_{0,o}^{(s)}, x_{1,o}^{(s)}, \ldots, x_{nx,o}^{(s)})$ of an original point $x_{i,o}^{(r)} = x_{i,o}^{(s)}$ for $i=0, \ldots, nx$;

b) substituting the value of the x-coordinates $(x_{0,o}^{(r)}, x_{1,o}^{(r)}, \ldots, x_{nx,o}^{(r)})$ into a new elliptic polynomial equation to obtain $$T^{(r)} = \sum_{l \in S_{nx}} b_{1l}^{(r)} (x_l^{(r)})^3 + \sum_{l,k \in S_{nx}, l \neq k} b_{2lk}^{(r)} (x_l^{(r)})^2 x_k^{(r)},$$

wherein any value of $(x_{0,o}^{(r)}, x_{1,o}^{(r)}, \ldots, x_{nx,o}^{(r)})$ leads to a value of; and c) if $T^{(r)}$ is quadratic reside, then setting $y_o^{(r)} = \sqrt{T^{(r)}}$ and the hopped point is given by $(x_{0,o}^{(r)}, x_{1,o}^{(r)}, \ldots, x_{nx,o}^{(r)}, y_o^{(r)})$, and if T is non-quadratic residue, then setting $y_o^{(r)} = \sqrt{g^3 T^{(r)}}$, and the hopped point is given by $(gx_{0,o}^{(r)}, gx_{1,o}^{(r)}, \ldots, gx_{nx,o}^{(r)}, y_o^{(r)})$.

* * * * *